March 14, 1967 C. STELZER ET AL 3,308,832
METHOD FOR PRODUCING FILTER CIGARETTES AND THE LIKE
Filed July 21, 1964 13 Sheets-Sheet 1

Inventors:
CARL STELZER
BERNHARD SCHUBERT

Michael J. Striker
BY THEIR ATTORNEY

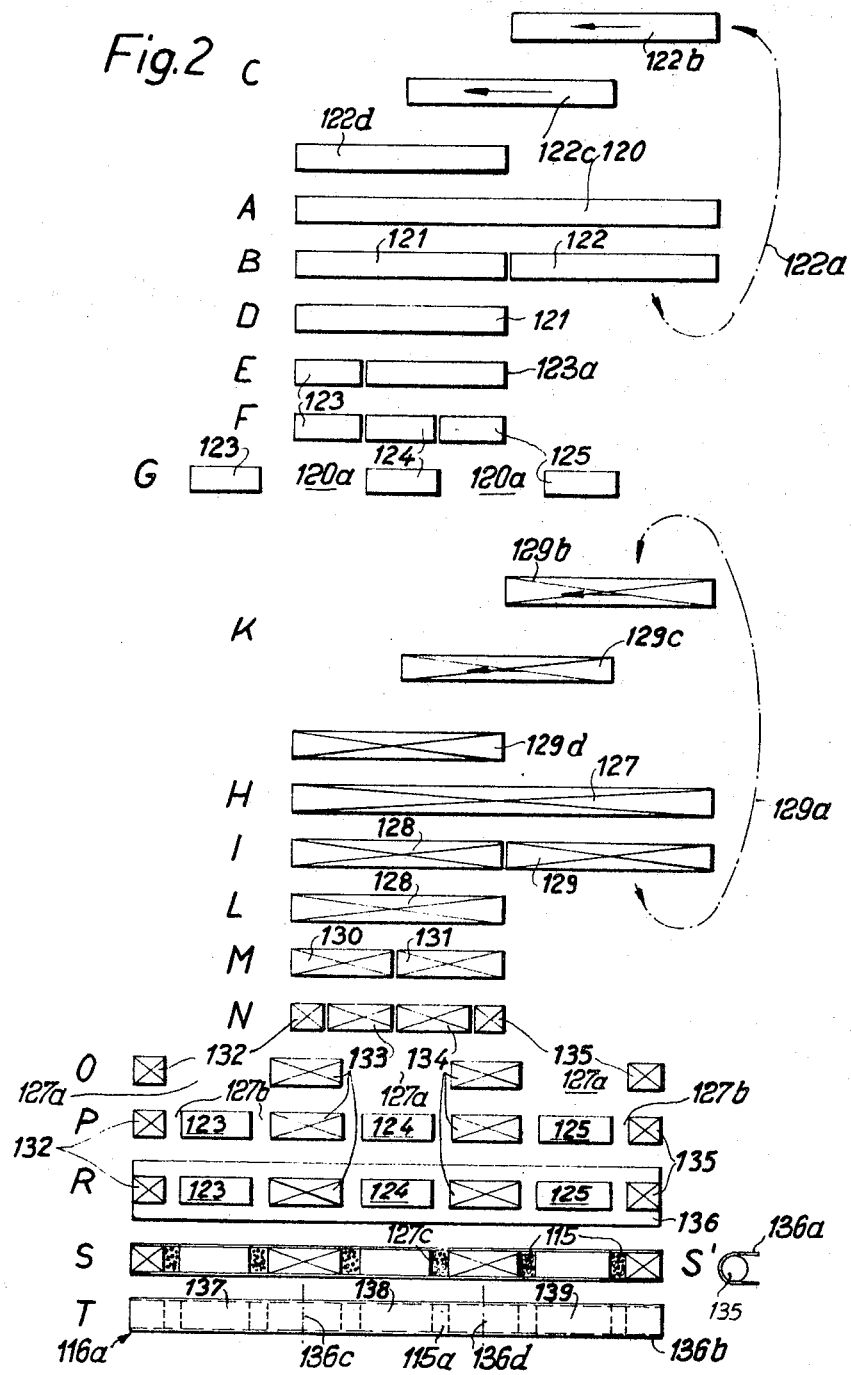

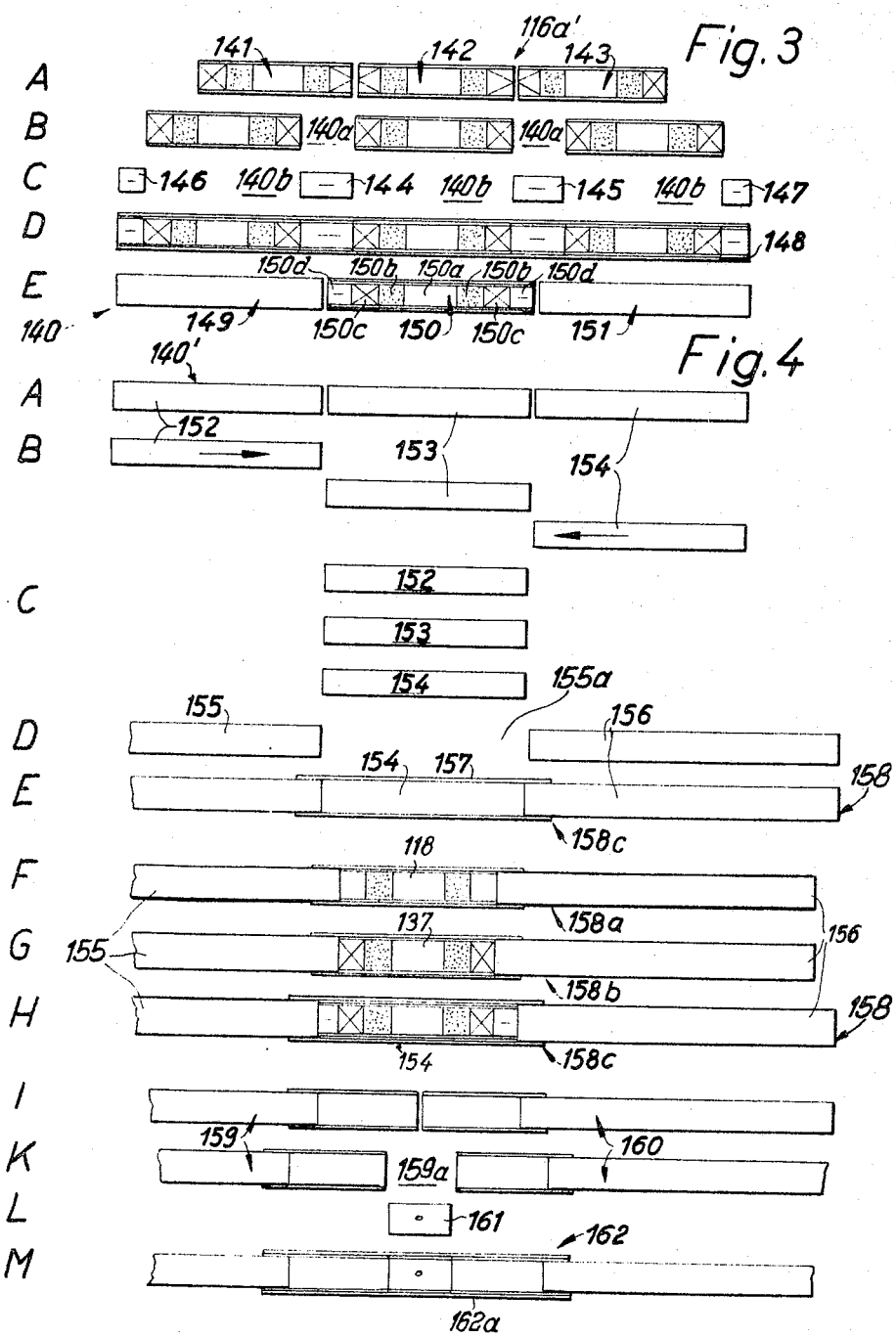

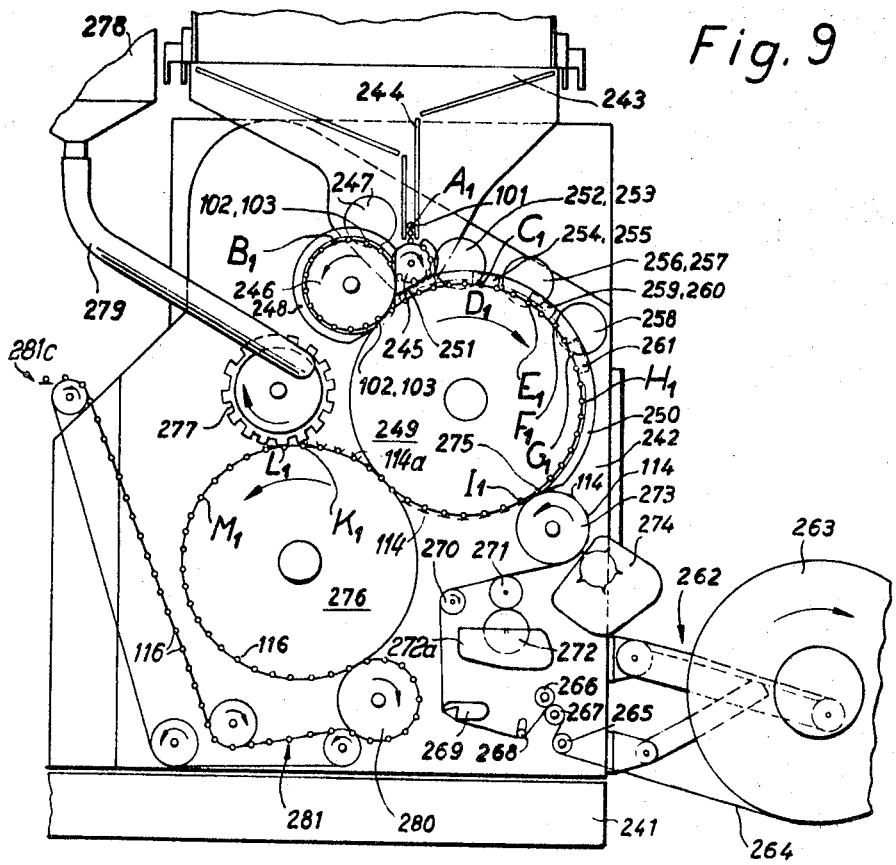

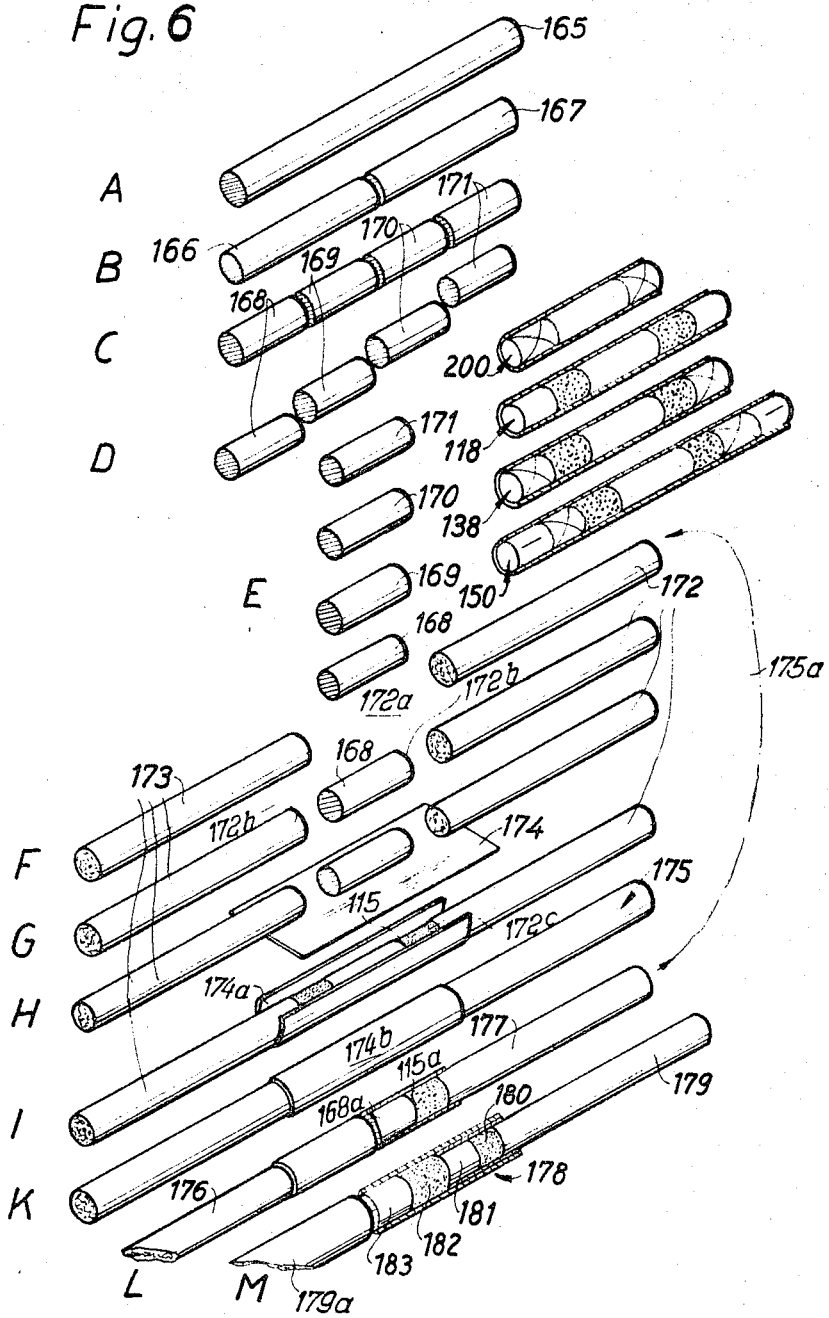

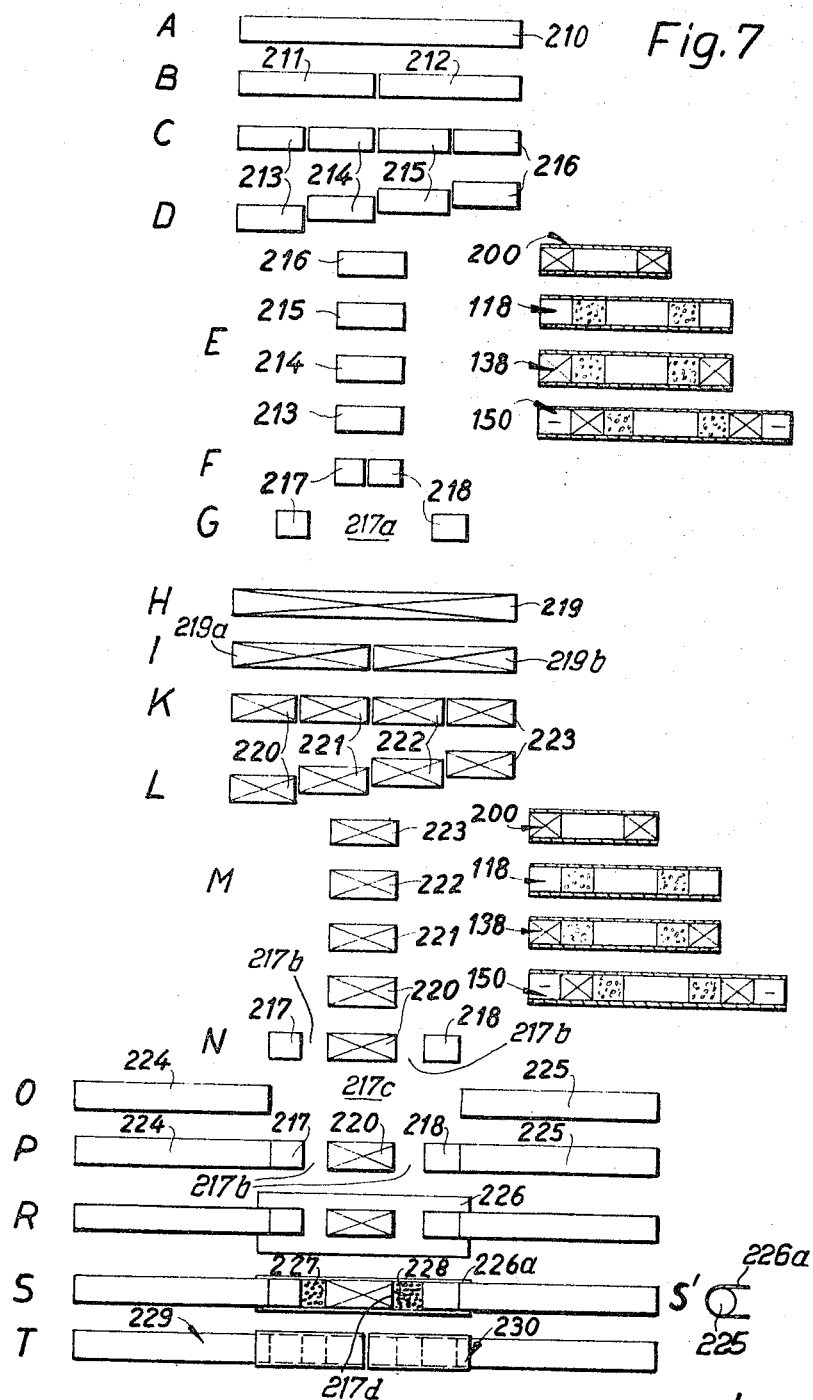

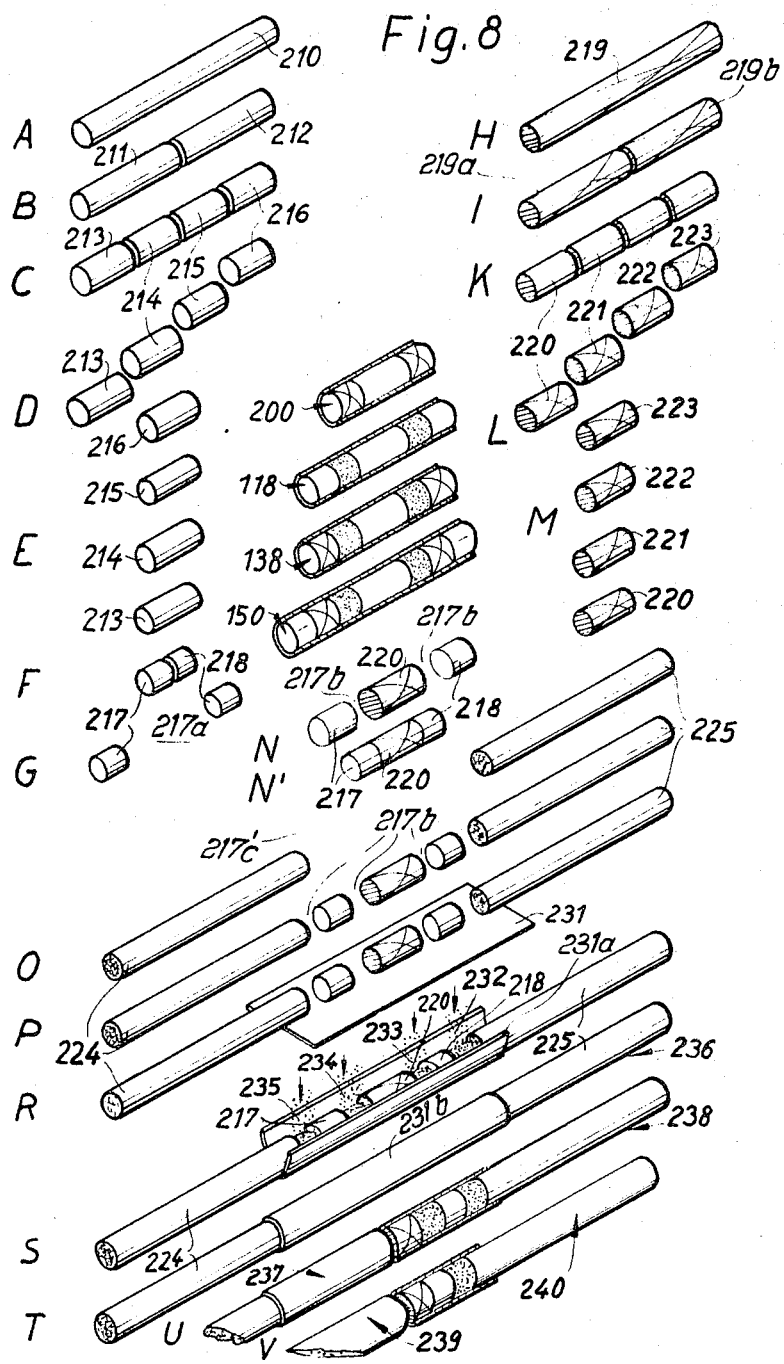

March 14, 1967  C. STELZER ETAL  3,308,832
METHOD FOR PRODUCING FILTER CIGARETTES AND THE LIKE
Filed July 21, 1964  13 Sheets-Sheet 9
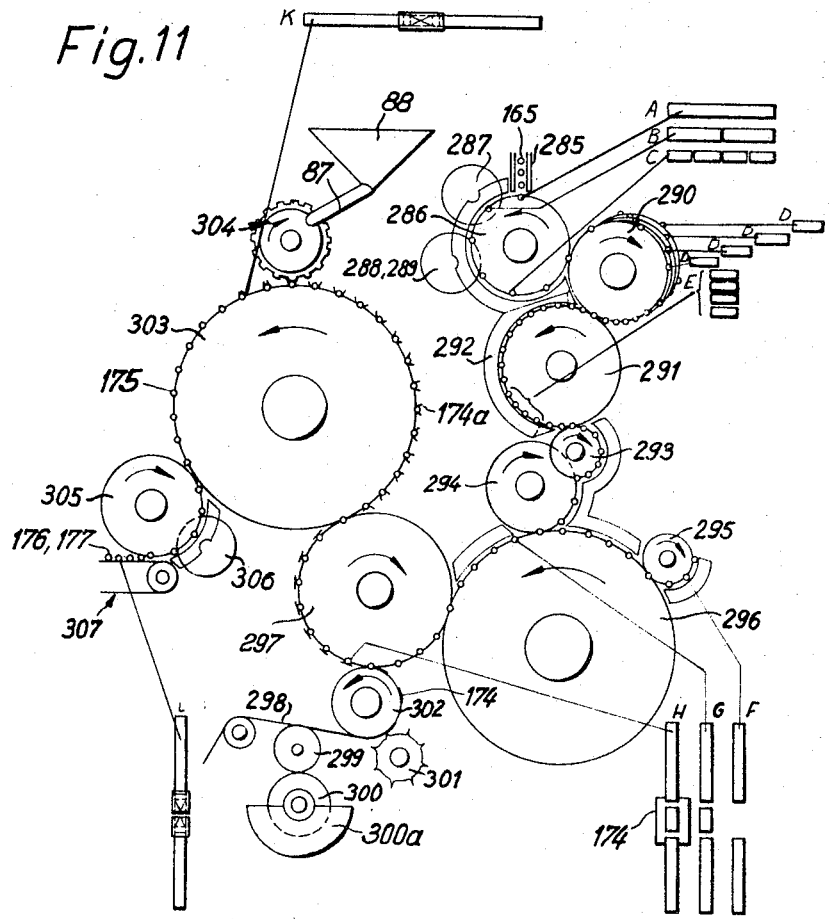
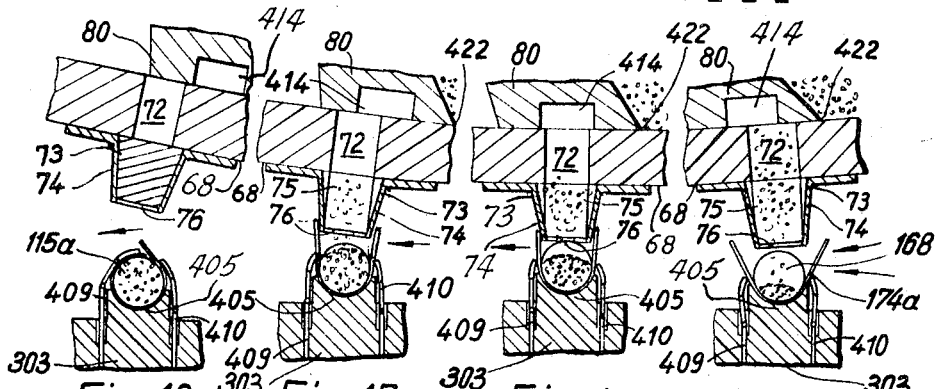
Inventors:
CARL STELZER
BERNHARD SCHUBERT
BY THEIR ATTORNEY March 14, 1967 C. STELZER ETAL 3,308,832
METHOD FOR PRODUCING FILTER CIGARETTES AND THE LIKE
Filed July 21, 1964 13 Sheets-Sheet 10

Inventors:
CARL STELZER
BERNHARD SCHUBERT

Michael J. Striker
BY THEIR ATTORNEY

March 14, 1967 C. STELZER ETAL 3,308,832
METHOD FOR PRODUCING FILTER CIGARETTES AND THE LIKE
Filed July 21, 1964 13 Sheets-Sheet 13

Inventors:
CARL STELZER
BERNHARD SCHUBERT

Michael J. Striker

BY THEIR ATTORNEY

United States Patent Office 3,308,832
Patented Mar. 14, 1967

3,308,832
METHOD FOR PRODUCING FILTER
CIGARETTES AND THE LIKE
Carl Stelzer, Hamburg-Bergedorf, and Bernhard Schubert, Hamburg-Lohbrugge, Germany, assignors to Hauni-Werke Körber & Co. K.G., Hamburg-Bergedorf, Germany
Filed July 21, 1964, Ser. No. 384,131
Claims priority, application Great Britain, July 22, 1963, 29,014/63; Aug. 9, 1963, 31,553/63; Aug. 19, 1963, 32,673/63
32 Claims. (Cl. 131—20)

The present invention relates to the production of composite filter mouthpieces, filter-tipped cigarettes, cigarillos, cigars and similar rod-shaped smokers' products. More particularly, the invention relates to a method for producing special types of mouthpieces for use in the manufacture of rod-shaped smokers' products, especially filter cigarettes. Still more particularly, the invention relates to a method which may be utilized with advantage in the manufacture of filter-tipped smokers' products wherein the mouthpiece contains at least one filter consisting of loose granular or pelletized filter material, such as charcoal, activated charcoal, other forms of carbon and the like. In all embodiments of our invention, the ultimate product is or contains a mouthpiece which includes at least two filters of predetermined length whereby one or more filters may consist of fibrous material, of pelletized granular or pulverulent filter material, of loose (flowable) granular or pulverulent filter material, and/or of fibrous material which contains granules of activated charcoal or the like. Also, one or more filters may simply consist of airfilled hollow tubular stock.

It is an important object of our invention to provide a method of producing improved filter mouthpieces which are capable of absorbing deleterious components from tobacco smoke and to provide an apparatus for the practice of our method in such a way that the mouthpieces may be produced at high speed, with utmost precision, with a minimum of waste, and in comparatively small and compact machines.

Another object of the invention is to provide a method of producing filter mouthpieces and/or filter-tipped smokers' products according to which two or more entirely different types of filter material may be assembled and joined in a continuous operation, according to which the thus obtained mouthpieces may be assembled with tobacco rods in a fully automatic way, and according to which two or more filter materials of different consistencies may be assembled, joined and further processed in a mass-producing operation such as is required in modern tobacco processing plants.

Still another object of our invention is to provide a method of producing rod-shaped smokers' products according to which the rod-shaped members may move axially or at right angles to their axes at the time such rod-shaped members are assembled with filters consisting of granular, pulverulent, pelletized and/or rod-shaped fibrous material.

With the above objects in view, one feature of our invention resides in the provision of a method of producing composite mouthpieces for filter cigarettes and the like. In its elementary form, the method comprises the steps of arranging a first rod-shaped member which constitutes a filter for tobacco smoke in axial alignment with but at a predetermined distance from a second rod-shaped member whereby the thus aligned rod-shaped members are separated by a gap of selected length, applying around portions of the rod-shaped members an adhesive-coated wrapper of paper or the like to transform the gap into an open-sided pocket, introducing into the open-sided pocket a predetermined quantity of flowable granular, pelletized or rod-shaped fibrous filter material so that the pocket is at least partially filled with such filter material, and convoluting the wrapper around the rod-shaped members to seal the pocket whereby the filter material is entrapped in the pocket to form a further filter which, together with the first rod-shaped member, constitutes a composite mouthpiece.

The first rod-shaped member may be a filter of unit length, a filter rod section of multiple unit length, or a prefabricated mouthpiece of multiple unit length. The second rod-shaped member may be a tobacco rod of unit length or multiple unit length, a filter of unit length, a filter rod section of multiple unit length or a prefabricated mouthpiece of multiple unit length. Such prefabricated mouthpieces may already comprise one or more filters of granular, pulverulent, pelletized or similar filter material. Also, the second rod-shaped member may consist of a material which may but need not be identical with the material of the first rod-shaped member. The pocket may receive pelletized, rod-shaped or flowable granular or pulverulent filter material which can be fed by gravity flow, in admixture with a compressed gas and/or by centrifugal force.

An apparatus for carrying out our invention serves to assemble mouthpieces, filter cigarettes and similar smokers' products of the type comprising rod-shaped members surrounded by adhesive-coated wrappers. In its simplest form, the apparatus comprises conveyor means arranged to advance consecutive pairs of coaxial rod-shaped members which are spaced from each other to define gaps of predetermined length, means for applying adhesive-coated wrappers around portions of consecutive pairs of rod-shaped members so as to transform the gaps into open-sided pockets, a filling device arranged to introduce a granular, pulverulent, pelletized or plug-shaped filter material into the pockets between consecutive pairs of rod-shaped members, and means for convoluting the wrappers around consecutive pairs of rod-shaped members to seal the pockets and to thus entrap the filter material therein.

The conveyor means may comprise a series of rotary drums with axially parallel peripheral pockets for the rod-shaped members and the exact construction of the filling device will depend on the nature of filter material, on the speed of the conveyor on which the rod-shaped members are supported at the time the pockets receive filter material, and/or on the position of the filling device with reference to the conveyor means. If the filter material is freely flowing, the filling device may discharge such material by gravity feed, in admixture with blasts of compressed air, and/or by centrifugal force. In such instances, the open sides of the pockets preferably face upwardly while the filling device feeds granular or pulverulent filter material, and the filling device may resemble a hollow drum arranged to receive filter material from a suitable source and to discharge measured quantities of such material through sealable apertures or bores which extend radially outwardly from an internal chamber in the filling device.

In the following detailed description and claims, the expression "granular" should be construed to embrace all kinds of granules, powders and otherwise comminuted substances which are capable of removing deleterious components from tobacco smoke.

The novel features which are considered as characteristic of the invention are set forth in particular in the appended claims. The invention itself, however, will be best understood upon perusal of the following detailed description of certain specific embodiments with reference to the accompanying drawings, in which:

FIG. 2 illustrates a series of steps in a second method which is utilized for producing filter mouthpieces wherein a granular filter of unit length is flanked by two rod- or plug-shaped filters of unit lentgh but consisting of different filter materials;

FIG. 3 illustrates certain steps of a third method which is used to produce mouthpieces consisting of four different filter materials;

FIG. 4 illustrates the steps of assembling filter mouthpieces of double unit length with pairs of coaxial tobacco rods to obtain filter cigarettes of double unit length;

FIG. 5 illustrates certain steps in a method of producing filter mouthpieces which comprise two different filter materials but need not be provided with a granular or pelletized filter;

FIG. 6 illustrates the steps of a method which is utilized to produce filter cigarettes or similar rod-shaped smokers' products wherein the mouthpiece comprises a granular filter of unit length which is immediately adjacent to the inner end of the tobacco rod;

FIG. 7 illustrates the steps of a method which differentiates from the method of FIG. 6 in that the inner end of each tobacco rod is adjacent to a rod-shaped filter of unit length;

FIG. 8 shows a further method of making filter cigarettes or the like according to which the mouthpiece of each filter cigarette comprises at least two filters of granular material and wherein one such granular filter is placed immediately adjacent to the inner end of the cigarette rod;

FIG. 9 is a side elevational view of an apparatus which is utilized for mass production of composite mouthpieces in accordance with the method of FIG. 1;

FIG. 11 is a side elevational view of a third apparatus which is utilized for mass production of filter cigarettes in accordance with the method of FIG. 6;

Figure 13:
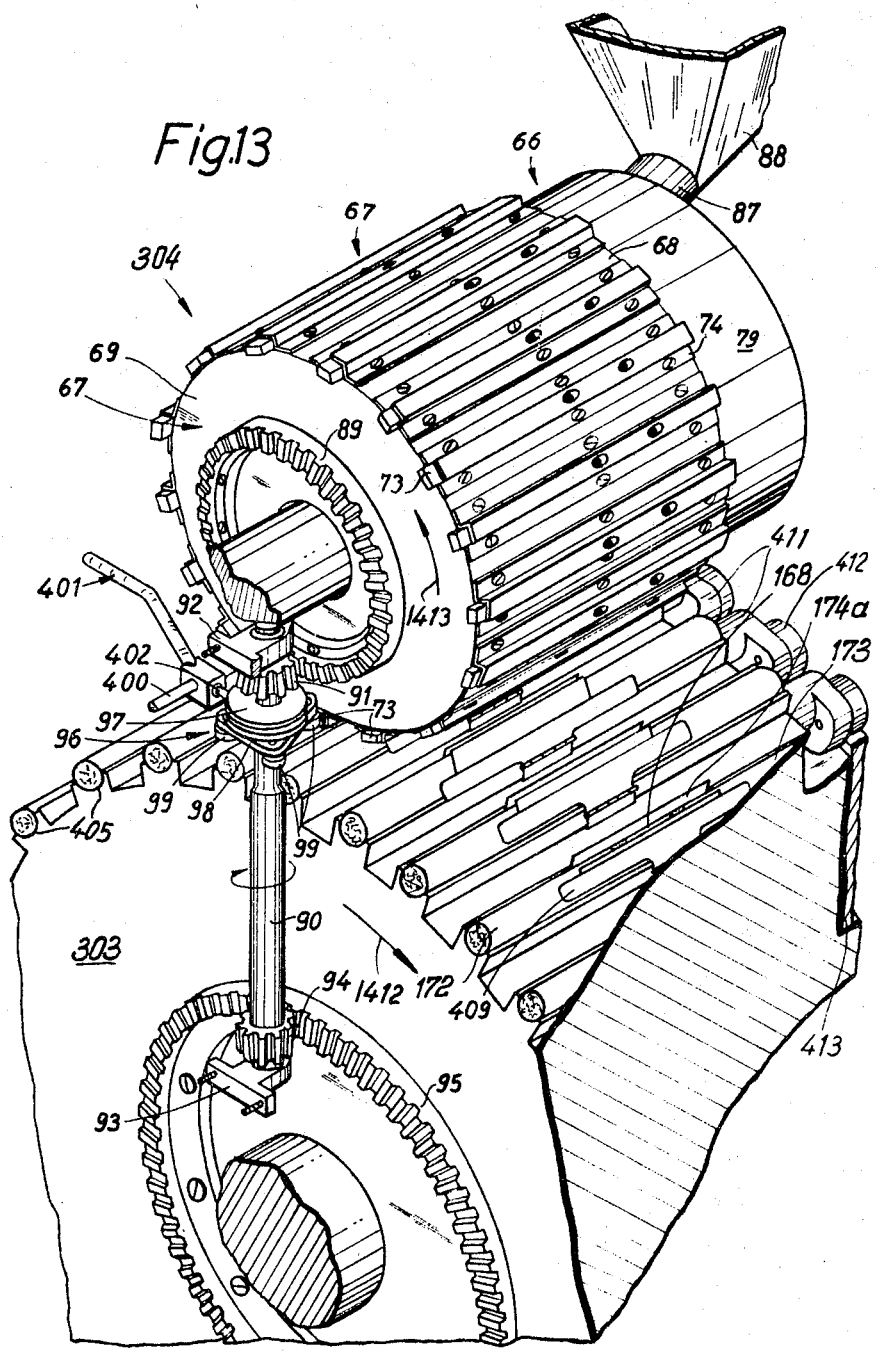
FIG. 13 is an enlarged perspective view of a filling device which is utilized in the apparatus of FIG. 11 to feed granular filter material.
Figure 14:
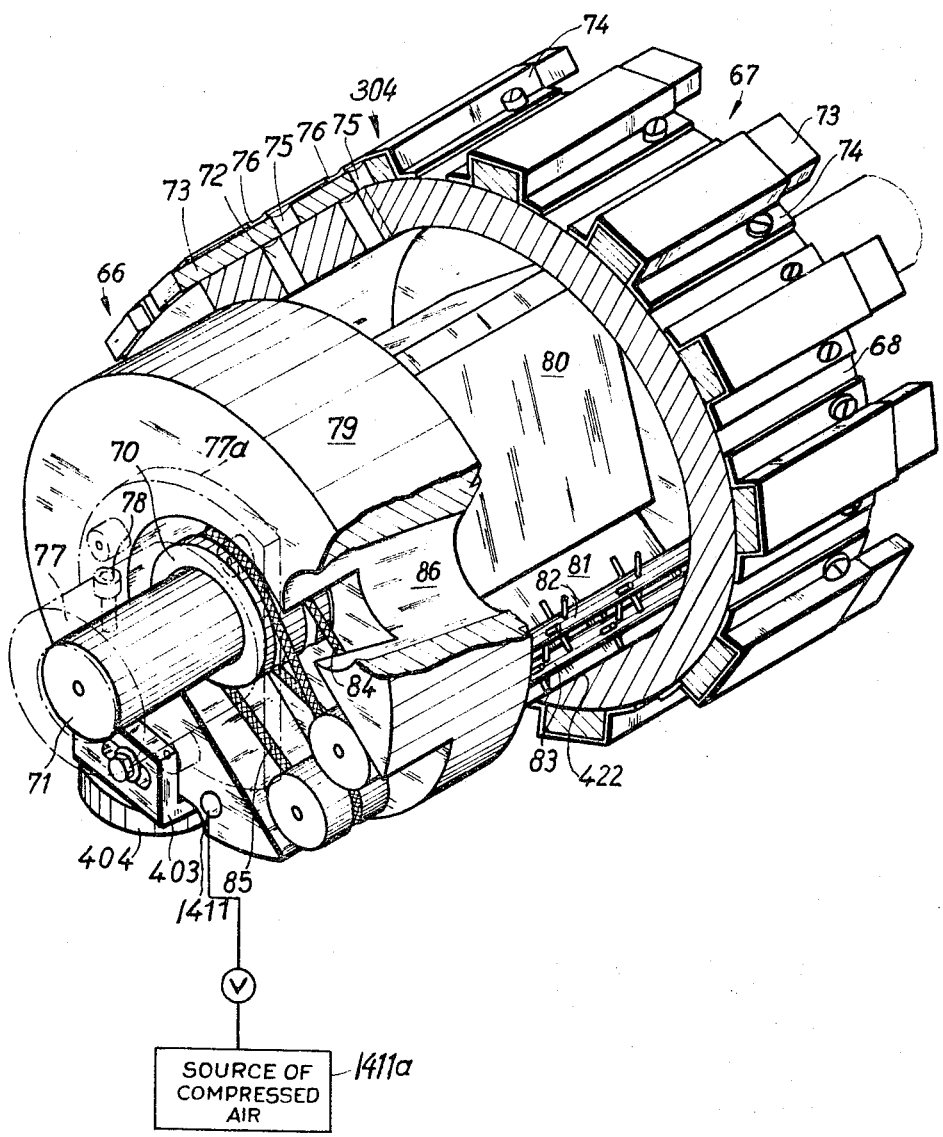
FIG. 14 is another perspective view showing the opposite side of the filling device with certain parts broken away.
Figure 19:
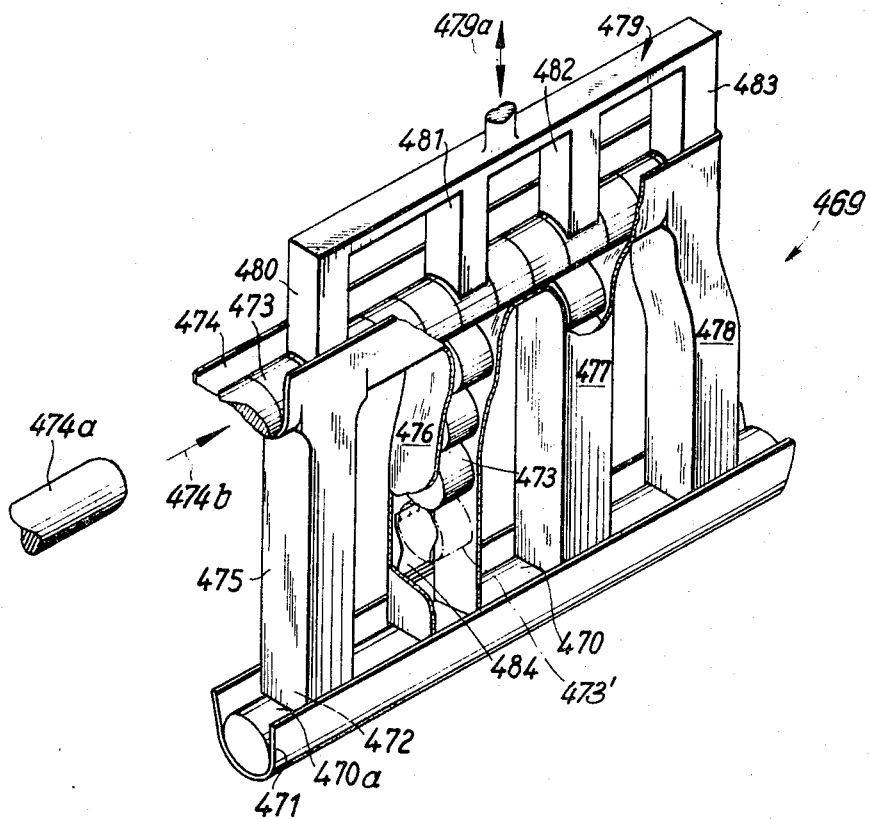

FIGS. 15 to 18 illustrate the steps of feeding measured quantities of granular filter material from the filling devices of FIGS. 13 and 14 into a series of aligned pockets formed by a substantially U-shaped adhesive-coated wrapper body; and FIG. 19 is a perspective view of a modified filling device which is utilized for feeding pelletized filter material, certain parts of this feeding device being broken away.

Figure 1:
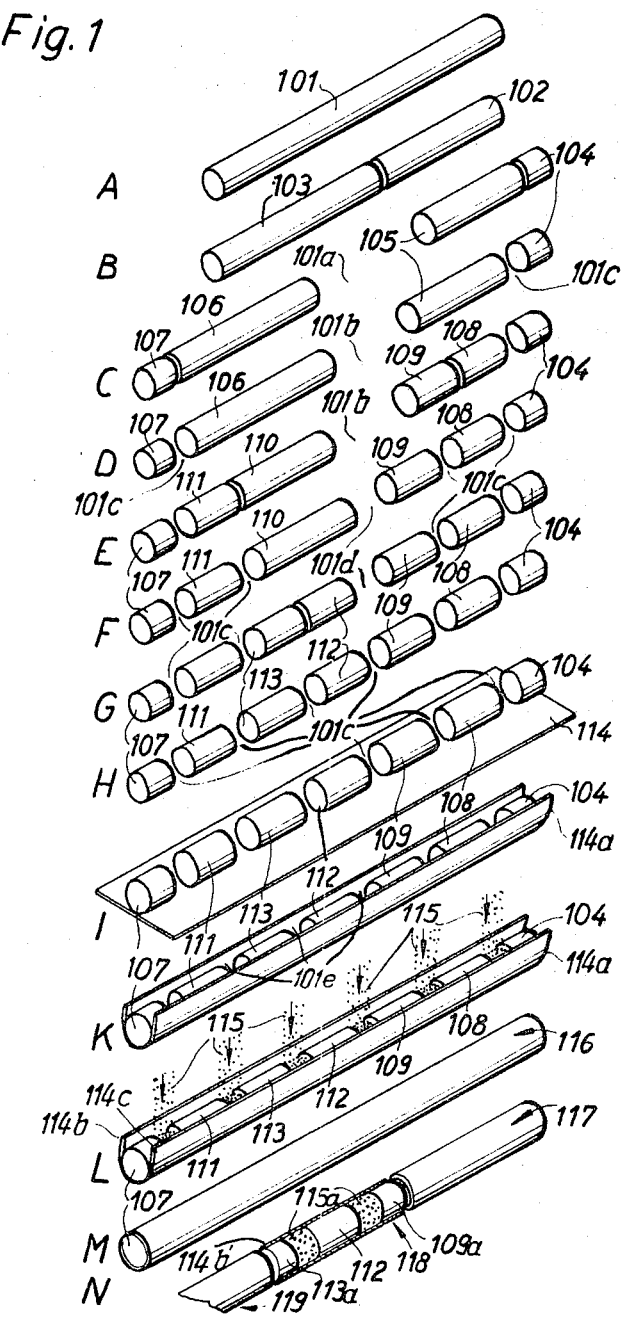
FIG. 1 illustrates a series of steps which form part of a first method for the production of filter mouthpieces wherein each mouthpiece comprises a granular filter of unit length flanked by two identical rod- or plug-shaped filters of unit length.

FIG. 1 illustrates certain steps in a method of producing composite filter mouthpieces of the type wherein each mouthpiece of ultimate or unit length comprises two rod-shaped outer filters of identical material and an intermediate or inner filter of granular material. The steps of this method are identified by capital letters A, B, C . . . N. In the first step A, a filter rod 101 of twelve times unit length and consisting of Estron fibers or the like is fed in a direction at right angles to its axis and is severed in a plane which is perpendicular to its axis to yield a first filter rod section 102 of quintuple unit length and a second filter rod section 103 of seven times unit length as indicated at B. The sections 102, 103 are thereupon shifted axially and away from each other to provide between their inner ends a gap 101a whose length is determined in advance for the purpose which will become apparent later. In the step C, the sections 102, 103 are severed to respectively yield two rod-shaped outer filters 104, 107 of unit length and two intermediate sections 105, 106 of quadruple (105) and sextuple (106) unit length. In the step D, the intermediate sections 105, 106 are moved axially and toward each other to reduce the length of the gap 101a (see the gap 101b) and to form two additional gaps 101c of unit length. In the step E, the intermediate sections 105, 106 are severed to respectively yield sections 108, 109 and sections 110, 111. The sections 108, 109 and 111 are of double unit length, and the section 110 is of quadruple unit length. In the step F, the section 110 is moved axially toward the section 109, and the section 109 is moved axially and away from the section 108 to provide two additional gaps 101c of unit length and to simultaneously reduce the length of the gap 101b (see the gap 101d which is of double unit length). The step G comprises severing the section 110 so as to yield two sections 112, 113 of double unit length, and the step H comprises moving the section 112 axially and away from the section 113 to provide a gap 101c of unit length (between the sections 112, 113) and to simultaneously reduce the length of the gap 101d to one of unit length so that the thus obtained assembly of seven coaxial rod- or plug-like parts comprises two outer filters 104, 107 of unit length and five inner sections 108, 109, 112, 113, 111 of double unit length, each pair of adjacent sections or filters and sections being separated by a gap 101c of unit length. In other words, the axial length of the gap 101a is six times the length of a gap 101c.

In the step I, the assembly shown at H is brought in contact with an elongated flat rectangular wrapper 114 of identical length whereby the sections and filters automatically adhere to the inner (upper) side of this wrapper because the upper side is coated with a layer of suitable adhesive. In other words, the length of the gaps 101c remains unchanged because the axial positions of the sections and filters remain unchanged. In the step K, the wrapper 114 is partially convoluted around the assembly of equidistant filters and sections 104, 108, 109, 112, 113, 111, 107 so as to form a channel- or trough-like wrapper body 114a of U-shaped or V-shaped cross section whereby each gap 101c resembles a pocket 101e. The upper sides of the pockets 101e are open but all other sides thereof are bounded in part by the material of the wrapper body 114a and in part by the end faces of adjoining filters and sections. The step L comprises filling the open-sided pockets 101e at least partially with measured quantities of granular filter material 115 which may be admitted by gravity feed and/or by blasts of air so that the pockets 101e are at least partially filled. In the step M, the wrapper body 114a is fully convoluted around the assembly of filters, sections and the interposed measured quantities of filter material 115 to form a mouthpiece 116 of sextuple unit length. This mouthpiece 116 is then severed midway across the sections 109 and 113 to yield three mouthpieces 117, 118, 119 of double unit length, see the step N. The mouthpiece 118 is shown with its tubular wrapper 114b' partially broken away to reveal that it comprises two rod-shaped filters 109a, 113a of unit length, a section 112 of double unit length, and two granular filters 115a of unit length. The other two mouthpieces 117, 119 are of identical construction. Such mouthpieces 117, 118, 119 of double unit length are ready to be inserted between pairs of axially aligned but spaced tobacco rods of unit length to form therewith filter-tipped cigarettes, cigars or cigarillos of double unit length. After the thus obtained assemblies of tobacco rods and mouthpieces of double unit length are connected to each other by adhesive-coated wrappers, not shown, each assembly is severed across the center of its mouthpiece to yield two filter cigarettes, cigars or cigarillos of unit length. For example, the mouthpiece 118 of double unit length will be severed across the section 112 to yield two mouthpieces of unit length each comprising one-half of the section 112, one of the granular filters 115a and one of the filters 109a, 113a. In other words, each mouthpiece of ultimate or unit length comprises two rod-shaped end filters of unit length and a granular inner filter of unit length. That rod-shaped filter which is located at the free end of the mouthpiece prevents escape of granular filter material. As stated above, the granular material 115 may but need not completely fill the respective pocket 101e. The apparatus for practicing the method of FIG. 1 will be described in connection with FIG. 9.

It is to be noted that upwardly extending legs or marginal portions 114b, 114c of the channel-shaped wrapper body 114a may but need not be exactly parallel to each other. Thus, a section through the body 114 may resemble the letter V or, alternatively, the preliminary folding or convoluting step may be carried so far that the distance between the horizontal edges of the legs 114b, 114c will be even less than the diameter of a filter rod. All that counts is to provide pockets 101e which are sufficiently enclosed to insure that the granular material 115 will remain therein during the step M, i.e., while the wrapper body 114a is being fully convoluted around the assembly of sections shown at H to form a tube or cylinder.

FIG. 2 illustrates the steps A, B . . . T of a second method which is utilized to produce mouthpieces of the type wherein a granular inner filter of unit length is again located between two rod-shaped outer filters of unit length but the two outer filters consist of different fibrous materials.

In the step A, a first type of filter rod 120 of twelve times unit length (hereinafter called white filter rod) is advanced in a direction at right angles to its axis and is severed midway between its ends to yield two white sections 121, 122 of sextuple unit length as shown at B. The section 122 is then manipulated (see the step C) in a manner as indicated by the arrow 122a to move through intermediate positions 122b, 122c and into a position 122d in which it remains parallel with but is located behind the section 121 whereby the sections 121, 122 form a single file, see the step D. In the step E, the section 121 is severed to yield a white section 123 of double unit length and a white section 123a of quadruple unit length. The step F comprises severing the section 123a to yield two white sections 124, 125 of double unit length which are coaxial with the section 123, and the step G comprises shifting the sections 123, 125 axially and away from the section 124 to obtain two gaps of (what may be termed) quadruple unit length. The device for shifting the section 122 as indicated by the arrow 122a will be described in connection with FIG. 10.

The step H of FIG. 2 comprises severing a second type of filter rod 127 (hereinafter called black rod) or twelve times unit length to yield two black sections 128, 129 of sextuple unit length, see the step I. The section 129 is then manipulated in a step K (see the arrow 129a) through stages 129b, 129c to a position 129d in which the sections 128, 129 form a single file (step L). In the step M, the section 128 is severed to yield two black sections 130, 131 of triple unit length, and the step N comprises severing the sections 130, 131 to obtain two black outer filters 132, 135 of unit length and two intermediate black sections 133, 134 of double unit length. The step O comprises shifting the black filters 132, 135 and the black sections 133, 134 axially and away from each other to form gaps 127a of what may be termed quadruple unit length. Each of these gaps 127a may receive with requisite clearance one of the white sections 123, 124, 125. In the step P, the white sections 123–125 are shuffled or interdigitated with the black filters 132, 135 and black sections 133, 134 in such a way that a white section invariably alternates with a black section, that the black filters 132, 135 are disposed at the ends of the thus obtained assembly, and that the gaps 127b between the adjacent filters and sections are of unit length. In the step R, a flat rectangular wrapper 136 is caused to adhere to the assembly or group of equidistant filters 132, 135 and sections 123, 133, 124, 134, 125 in such a way that the length of the gaps 127b remains unchanged and that the filters and the sections remain coaxial with each other. In the step S, the wrapper 136 is partially convoluted to form a substantially U-shaped wrapper body 136a (best shown at S') whereby the gaps 127b are transformed into open-sided pockets 127c each of which may receive a measured quantity of flowable granular filter material 115 which is introduced from above and may but need not completely fill the respective pocket 127c. The filter material may be fed by gravity flow, in admixture with compressed air and/or by centrifugal force. In the step T, the wrapper body 136a is fully convoluted to form a tube 136b whereby the resulting rod 116a constitutes a mouthpiece of sextuple unit length. This mouthpiece may be severed at two points (see the lines 136c, 136d) to yield three mouthpieces 137, 138, 139 of double unit length whereby each such mouthpiece of double unit length comprises one of the white sections 123–125 of double unit length and two black outer filters of unit length. The manner in which the mouthpieces 137, 138, 139 may be assembled with tobacco rods of unit length is the same as described in connection with FIG. 1. The white section 122 is then processed in the same way as the section 121, and the black section 129 is processed in the same way as the section 128 so that the portions of the sections 122, 129 will form a next assembly which is identical with the one shown at P. The apparatus for practicing the method of FIG. 2 will be described in connection with FIG. 10.

It should be noted that the axial length of the black filter rod 127 need not be the same as that of the white filter rod 120, and also that the axial length of an outer filter 132 or 135 need not be the same as the length of a gap 127b. Therefore, when we speak of gaps 120a and 127a which are of quadruple unit length, we wish to state that each gap 120a must be long enough to accommodate one of the black sections 133, 134 and to simultaneously provide two gaps 127a, and that each gap 127a must be long enough to accommodate one of the white sections 123–125 and to simultaneously provide two gaps 127b of unit length.

The methods of FIGS. 1 and 2 may be utilized for producing mouthpieces similar to 116 (FIG. 1) or to 116a (FIG. 2) but being of quadruple, eight times, ten times, etc. unit length. The manner of so modifying our methods will be self-evident to men having average skill in this art. Thus, and referring to FIG. 2, if the white filter rod 120 is of eight times unit length, it will yield four white sections of double unit length. The black filter rod 127 is then replaced by one of eight times unit length to yield three black sections of double unit length and two black outer filters of unit length.

FIG. 3 illustrates certain steps in the method of producing filter mouthpieces of double unit length wherein each such mouthpiece comprises an inner section of a first material and of double unit length, two granular filters of unit length, and two pairs of outer filters of unit length whereby the filters of each pair consist of different material so that each mouthpiece actually comprises four different filter materials. In the step A, a rod-shaped mouthpiece 116a' corresponding to the one shown at T in FIG. 2 is severed at two points to yield three mouthpieces 141, 142, 143 of double unit length. The mouthpieces 141, 143 are shifted axially and away from the mouthpiece 142 to provide two gaps 140a of double unit length, as shown at B. A green filter rod (not shown) of twelve times unit length is then severed and manipulated in a manner as indicated at H–O in FIG. 2 (see the step C in FIG. 3) whereby one-half of such green filter rod yields two green end filters 146, 147 of unit length and two intermediate green sections 144, 145 of double unit length. The green sections 144, 145 and the green filters 146, 147 define between themselves gaps 140b of sextuple unit length so that each gap 140b may accommodate one of the mouthpieces 141–143 and the green sections 144, 45 simultaneously fill the gaps 140a. The thus aligned mouthpieces 141–143, green filters 146, 147 and green sections 144, 145 form an assembly of coaxial rod-shaped parts or members which is shown at D, and this step D also comprises applying a wrapper 148 in such a way that the latter adheres to each rod-shaped member of the assembly. In the step E, the wrapper 148 is fully convoluted around the assembly to form therewith a mouthpiece 140 of sextuple unit length, and such mouthpiece may be severed at two points to yield three mouthpieces 149, 150, 151 of double unit length. The mouthpieces 149–151 may be assembled with pairs of tobacco rods to produce filter cigarettes, cigarillos or cigars of double unit length.

It will be noted that the green filters 146, 147 of unit length are invariably located at the ends of the assembly which is connected wtih the wrapper 148. Each of the mouthpieces 149, 150, 151 comprises a white inner or central section 150a of double unit length, two granular filters 150b of unit length, two black filters 150c of unit length, and two green filters 150d of unit length. The granular filters 150b are disposed between the inner end faces of the black filters 150c and the end faces of the white section 150a.

Of course, the method of FIG. 3 may be repeated as often as desired by shifting the mouthpieces 149, 151 away from the mouthpiece 150, by providing two yellow sections of double unit length (corresponding to sections 144, 145) and two yellow filters (corresponding to filters 146, 147) of unit length, by thereupon shuffling such yellow sections and yellow filters with the mouthpieces 149–151 in a manner similar to that shown at D in FIG. 3, and by again applying a wrapper around the thus obtained assembly whereby the wrapper joins the component parts to form therewith a mouthpiece of sextuple unit length which may be severed to yield three mouthpieces of double unit length, each such mouthpiece of double unit length then having the components shown at 150a–150d plus two yellow filters of unit length.

Furthermore, and this follows clearly from FIG. 3, the filter rod which yields the sections 144, 145 and filters 146, 147 may consist of the same material as the white section 150a in the mouthpiece 141, 142 or 143. Also, the sections 144, 145 and filters 146, 147 may consist of the same black material as the filters 150c of the mouthpieces 141–143 even though this is less advisable since the production costs of such filters are reduced if the filters 150c of the mouthpieces 141–143 are simply cut longer.

Referring now to FIG. 4, there is shown the method of assembling mouthpieces of double unit length with pairs of coaxial tobacco rods to obtain filter cigarettes, cigarillos or cigars of double unit length. For the sake of simplicity, tobacco rods 155, 156 shown in FIG. 4 will be called cigarette rods and it will be assumed that the mouthpieces of double unit length shown at A–C, E, H–K and M correspond to mouthpieces 149–151 of FIG. 3. Thus, one starts with a mouthpiece 140′ of sextuple unit length which is severed at two points to yield three mouthpieces 152, 153, 154 of double unit length, see the step A in FIG. 4. Each of these mouthpieces comprises the same elements as shown at 150a–150d in FIG. 3 In the step B of FIG. 4, the mouthpieces 152–154 are staggered with reference to each other in directions at right angles to their axes so that they are parallel to each other and that the distance between their axes at least equals the diameter of a mouthpiece. In the step C of FIG. 4, the mouthpieces 152, 154 are shifted toward each other but remain parallel to the mouthpiece 153 to form a single file of equidistant parallel mouthpieces with the mouthpiece 154 located ahead of and the mouthpiece 152 trailing the median mouthpiece 153. In the step D of FIG. 4, two coaxial but spaced cigarette rods 155, 156 are shuffled with the mouthpiece 154 so that the latter is received in the gap 155a between the adjacent end faces of the cigarette rods. The thus obtained assembly is transformed into a filter cigarette 158 of double unit length which is shown partially wrapped at E and fully wrapped at H (but with its wrapper 158c and mouthpiece 154 shown in axial section). It will be seen that the composition of the mouthpiece 154 is the same as that of the mouthpiece 150 shown at E in FIG. 3. In the step I of FIG. 4, the filter cigarette 158 is severed midway across the wrapper 158c to yield two filter cigarettes 159, 160 of unit length which are thereupon processed in a manner well known per se and not forming part of the present invention.

If necessary, the mouthpieces of filter cigarettes 159, 160 may be lengthened by the addition of an additional outer filter. Thus, a yellow filter rod is severed to yield yellow sections 161 of double unit length one of which is shown at L in FIG. 4. The filter cigarettes 159, 160 are moved apart as shown at K to provide a gap 159a of double unit length and this gap may receive the section 161 as shown at M. The resulting filter cigarette 162 of double unit length is provided with a wrapper 162a which connects the filter cigarettes 159, 160 with the section 161 and the thus obtained rod is then severed across the wrapper 162a to yield two filter cigarettes of unit length each having a mouthpiece containing five different filter materials including a yellow filter of unit length which are obtained upon severing of the section 161. Of course, the mouthpieces 153, 152 are then assembled with additional pairs of coaxial cigarette rods to form consecutive filter cigarettes of double unit length.

The step F of FIG. 4 illustrates the manner in which a mouthpiece obtained by the method of FIG. 1 (for example, the mouthpiece 118) may be assembled with two cigarette rods 155, 156 of unit length to form a filter cigarette 158a of double unit length, and the step G of FIG. 4 illustrates the manner of combining two cigarette rods 155, 156 of unit length with a mouthpiece (for example, the mouthpiece 137) which is obtained by the method of FIG. 2 to form a filter cigarette 158b of double unit length.

It goes without saying that the steps K, L and M shown in FIG. 4 may be repeated as often as desired to obtain mouthpieces which comprises as many as six, seven or more different filter materials. All that is necessary is to move apart the filter cigarettes which are obtained by severing the filter cigarette 162 and by placing additional sections of double unit length into the thus obtained gap between the filter cigarettes of unit length.

FIG. 5 illustrated the steps P, R . . . U in a method which is utilized to produce filter mouthpieces of double unit length wherein each such mouthpiece comprises two different filter materials. The first step P corresponds to the step P of FIG. 2 and is preceded by the steps A–O which were explained in connection with FIG. 2. Thus there is provided an assembly of rod-shaped sections and filters including white sections 191, 193, 195 of double unit length which alternate with black outer filters 190, 196 of unit length and with black sections 192, 194 of double unit length. The gaps 190a between the adjacent filters and sections are of unit length, all filters and sections are coaxial with each other, and the filters 190, 196 are located at the ends of the assembly shown at P.

In the step R, the assembly is shortened by shifting the filters 190, 196 toward each other to eliminate the gaps 190a whereby white sections invariably alternate with black filters or black sections. In the step S, the assembly shown at R is connected with an adhesive-coated wrapper 197 which is convoluted in the step T to form with the filter material a mouthpiece 198 of sextuple unit length. The mouthpiece 198 is severed in the step U to yield three mouthpieces 199, 200, 201 of double unit length whereby each such mouthpiece comprises a white inner or central section 204 of double unit length, two black outer filters 202, 203 of unit length which are disposed at the ends of the respective mouthpiece 199, 200, or 201, and a tubular wrapper 205. These mouthpieces may be assembled with pairs of cigarette rods 155, 156 in a manner as described in connection with FIG. 4.

It will be noted that the filter mouthpieces 199–201 do not contain any granular filter material. However, and if necessary, the white sections 191, 193, 195 or the black filters 190, 196 and black sections 192, 194 may consist of filter material which comprises granules of charcoal or the like or such filters and sections may consist of pellets.

FIG. 6 illustrates the steps of a method which is utilized for the production of filter cigarettes. The difference between the methods of FIGS. 4 and 6 is that the latter method contemplates filling granular filter material into pockets between the inner ends of two tobacco rods and the adjacent ends of a filter section of double unit length. In the method of FIG. 4, the granular filter material is not directly adjacent to the ends of tobacco rods.

In the step A of the method shown in FIG. 6, a filter rod 165 of eight times unit length is advanced in a direction at right angles to its axis, and the step B comprises severing this rod 165 to yield two coaxial rod sections 166, 167 of quadruple unit length. In the step C, the sections 166, 167 are severed to respectively yield coaxial sections 168, 169 and 170, 171 of double unit length, and the step D comprises staggering the sections 168–171 in directions at right angles to their axes in such a way that the minimum distance between the axes of these sections at least equals the diameter of a section. In the step E, the sections 168–171 are shifted axially to form a single file with the section 168 located at the head and the section 171 located at the trailing end of the file.

The step F comprises shifting two tobacco rods 172, 173 of unit length axially and away from each other to form a gap 172a of (what may be termed) quadruple unit length, and the step G comprises shuffling or interdigitating the tobacco rods 172, 173 with the leading section 168 to obtain an assembly or group wherein the section 168 is located between the tobacco rods 172, 173 and forms therewith two gaps 172b of unit length. In the step H, a rectangular wrapper 174 is caused to adhere to the section 168 and to the adjacent end portions of the tobacco rods 172, 173, and the step I comprises partialy convoluting the wrapper to form a substantially U-shaped wrapper body 174a whereby the gaps 172b are transformed into pockets 172c each of which receives a measured quantity of granular filter material 115. In the step K, the wrapper body 174a is fully convoluted to form a tube 174b whereby the section 168 and the two granular filters 115a which are formed by the material 115 together constitute a mouthpiece of double unit length which connects the tobacco rods 172, 173. The resulting filter cigarette 175 of double unit length is severed midway across the mouthpiece to yield two filter cigarettes 176, 177 of unit length. Each of these filter cigarettes 176, 177 comprises a mouthpiece of unit length including a granular filter 115a and a rod-shaped filter or plug 168a, the filter 115a being immediately adjacent to the inner end of the respective tobacco rod.

If it is desired to provide the filter cigarettes with more complicated filters, the filter cigarettes 176, 177 are processed in the same way as the tobacco rods 172, 173. In other words, the steps F–L of the method shown in FIG. 6 are repeated by shifting the filter cigarettes 176, 177 away from each other (see the arrow 175a), to form a gap 172a of quadruple unit length a filter rod section of double unit length is then placed into the gap 172a to form two gaps 172b each of which is adjacent to one of the filters 168a, and a wrapper is caused to adhere to the thus obtained assembly and is partially convoluted to form two pockets 172c which receive measured quantities of granular filter material. The wrapper is thereupon convoluted still further to form a tube and the resulting filter cigarette 178 of double unit length (see the step M in FIG. 6) is severed across the mouthpiece to yield two filter cigarettes 179, 179a of unit length. Each of these cigarettes comprises a mouthpiece including two granular filters 180, 182 and two rod-shaped filters 181, 183, the granular filter 180 corresponding to the filter 115a shown at L, the filter 181 corresponding to the filter 168a shown at M, and the filter 182 being disposed between the filters 181, 183.

Of course, instead of utilizing the sections 168–171 of double unit length, the method shown in FIG. 6 may be practiced by replacing such sections with mouthpieces 200, 118, 138 or 150 of double unit length. It will be noted that the mouthpiece 200 is the one which was produced by method described in connection with FIG. 5, that the mouthpiece 118 is obtained by the method of FIG. 1, that the mouthpiece 138 is obtained by the method of FIG. 2, and that the mouthpiece 150 is obtained by the method of FIG. 3. In other words, the method of FIG. 6 may be a composite method which may comprise the steps of making mouthpieces of double unit length in accordance with any of the previously described methods and the steps G–L of FIG. 6 in order to obtain filter cigarettes wherein at least one granular filter is immediately adjacent to the tobacco rod.

Of course, the method of FIG. 6 is a continuous one and, as soon as the section 168 is introduced into the gap 172a between the tobacco rods 172, 173, a next pair of coaxial tobacco rods is shuffled with the section 169, a third pair of tobacco rods is shuffled with the section 170, and so on. Also, a fresh filter rod 165 is severed in the manner as illustrated at A–C and the resulting sections of double unit length are shuffled as shown at D and E to provide a steady supply of such sections and to insure that the method may be carried out on a continuous basis. The apparatus for practicing the method of FIG. 6 will be described in connection with FIG. 11.

FIG. 7 illustrates the steps A, B . . . T of a further method which is utilized for producing filter cigarettes, cigarillos or cigars with composite mouthpieces containing at least one granular filter of unit length.

In the steps A to G, a white filter rod 210 of eight times unit length is severed midway between its ends to yield two white sections 211, 212 of quadruple unit length. The sections 211, 212 are severed to respectively yield white sections 213, 214 and 215, 216 of double unit length, and such sections are staggered transversely and are shifted axially to form a single file with the section 213 leading. Each consecutive section of this file is then severed to yield two white filters 217, 218 of unit length, and such filters are shifted axially and away from each other to form between themselves a gap 217a of quadruple unit length.

In the steps H–M, a black filter rod 219 of eight times unit length is severed to yield two black sections 219a, 219b of quadruple unit length, and the sections 219a, 219b are then severed to respectively yield black sections 220, 221 and 222, 223 of double unit length. Such sections 220–223 are then moved transversely and are shifted axially to form a single file of black sections with the section 220 leading. In the step N, the black section 220 is shuffled with the white filters 217, 218 to partially fill the gap 217a and to form two gaps 217b of unit length. The step O comprises shifting two tobacco rods 224, 225 axially and away from each other so as to form a gap 217c which is long enough to receive the parts shown at N, see the step P, and the step R comprises applying a flat rectangular wrapper 226 so that the ends of the wrapper adhere to the inner ends of the tobacco rods 224, 225 and a median portion of the wrapper adheres to the white filters 217, 218 and black section 220. The step S comprises partially convoluting the wrapper 226 to form a substantially U-shaped wrapper body 226a (best shown at S') whereby the gaps 217b are transformed into pockets 217d each of which may receive a measured quantity of granular filter material 227,228. The step T comprises completing the convolution of the wrapper body 226a to form a filter cigarette, cigarillo or cigar of double unit length, and such article is then severed across the mouthpiece to yield two filter cigarettes, cigars or cigarillos 229, 230 of unit length. Each ultimate product 229, 230 comprises a mouthpiece having one of the granular filters 227, 228 one of the white filters 217, 218, and one-half of the section 220.

Of course, and in order to produce an especially effective mouthpiece, the white sections 213–216 (shown at E) and/or the black sections 220–223 (shown at M) may be replaced by mouthpieces 200, 118, 138 or 150 of double unit length so that the mouthpiece in the ultimate products may comprise a large number of filters including combinations of granular filters with white, black, green and/or yellow filters of unit length.

FIG. 8 illustrates the steps of a method which is quite similar to the methods of FIGS. 6 and 7 excepting that one of the steps (S) comprises simultaneously feeding four batches of measured granular filter material. It can be said that the method of FIG. 8 combines the characteristic features of the methods whose steps are illustrated in FIGS. 6 and 7.

The steps A to G shown in FIG. 8 comprise severing a white filter rod 210 of eight times unit length to yield two white sections 211, 212 of quadruple unit length which are thereupon severed to respectively yield white sections 213, 214 and 215, 216 of double unit length. The sections 213–216 are moved first transversely and are then shifted axially to form a single file with the section 213 leading. The thus arrayed sections 213–216 are severed consecutively so that each thereof yields two white filters 217, 218 of unit length, and the filters 217, 218 are shifted to provide a gap 217a of quadruple unit length. Thus, the steps A–G of FIG. 8 correspond to the steps A–G of FIG. 7.

The steps H–M of FIG. 8 comprise severing a black filter rod 219 of eight times unit length to yield two black sections 219a, 219b of quadruple unit length, and the sections 219a 219b are severed to respectively yield black sections 220, 221 and 222, 223 of double unit length. The sections 220–223 are then moved first transversely and are then shifted axially to form a single file with the section 220 leading. The step N comprises shuffling the foremost white filters 217, 218 with the foremost black section 220 whereby the section 220 partially fills the gap 217a and defines with the filters 217, 218 two gaps 217b of unit length.

The step O comprises shifting two tobacco rods 224, 225 (which are assumed to constitute cigarette rods of unit length) axially and away from each other to form a gap 217c' of eight times unit length, and the step P comprises shuffling cigarette rods 224, 225 with the parts shown at N to obtain an assembly whose components are connected to the adhesive-coated inner side of a rectangular wrapper 231, see the step R. The step S comprises partially convoluting the wrapper 231 to form a substantially U-shaped wrapper body 231a whereby the four gaps 217b of unit length (see the step P) are transformed into pockets each of which receives a measured quantity of granular filter material (shown at 232, 233, 234 and 235) whereby the thus admitted granular material fills at least a portion of the respective pocket. The step T comprises completing the convolution of the wrapper body 231a so that the latter forms a tube 231b and the resulting rod 236 is a filter cigarette of double unit length which may be severed midway across its mouth piece to yield two filter cigarettes 237, 238 of unit length, see the step U. Such ultimate products are thereupon processed in a manner well known from the art of filter cigarette machines.

As shown in FIG. 8, the single file of white sections 213–216 and/or the single file of black sections 220–223 may be replaced by composite mouthpieces 200, 118, 138 or 150.

If the step N of FIG. 8 is replaced by a step N' which includes moving the white filters 217, 218 into actual abutment with the end faces of the black section 220, one obtains two filter cigarettes 239, 240 of the type shown in the step V. Of course, the step S is then replaced by a step which includes admitting only two batches of measured granular material, i.e., the batches 233, 234 are not necessary.

It is to be noted that the granular material which is admitted at 232 and 235 need not be the same as the material which is admitted at 233 and 234. In other words, each filter cigarette 237 or 238 may comprise a mouthpiece with two granular filters which consist of different materials.

FIG. 9 illustrates an apparatus which may be utilized for practicing the method whose steps are illustrated in FIG. 1. Therefore, the construction and operation of this apparatus will be explained with continuous reference to FIG. 1.

The apparatus of FIG. 9 comprises a base 241 which supports a plate- or wall-like upright frame member 242 arranged to support all or nearly all remaining component parts of the apparatus. The upper end portion of the frame member 242 carries a source of white filter rods 101 of twelve times unit length, here shown as a magazine 243, which is provided with a vertical or nearly vertical chute 244 serving to deliver filter rods 101 by gravity feed so that each filter rod descends in a direction at right angles to its axis and enters one of several axially parallel pockets or holders provided in the periphery of a constantly driven inserting conveyor here shown as a small drum 245. The reference character $A_1$ shown in FIG. 9 indicates a step which corresponds to the step A shown in FIG. 1, and the reference characters $B_1$, $C_1$ . . . $M_1$ respectively indicate steps which correspond to steps B, C . . . M shown in FIG. 1.

The drum 245 inserts filter rods 101 into consecutive peripheral pockets or holders of a constantly driven supporting conveyor or drum 246 (hereinafter called cutting drum) which advances the rods 101 transversely and past a revolving disk-shaped cutter 247 which severs the rods so that each such rod yields two coaxial white rod sections 102, 103 of sextuple unit length. Certain portions of the cutting drum 246 are surrounded by arcuate shields 248 which are fixed to the frame member 242 and serve to retain the rods 101 and rod sections 102, 103 in their respective pockets.

The drum 246 delivers pairs of coaxial white sections 102, 103 into consecutive peripheral pockets or holders of a second cutting conveyor or drum 249 which is driven at constant speed and advances such sections past a wedge-like cam 251 serving to shift the sections 102, 103 axially and away from each other and to form the gaps 101a shown in FIG. 1. In other words, the cam 251 serves as a spreading or shifting device by automatically increasing the distance between the inner ends of consecutive sections 102, 103. Certain portions of the cutting drum 249 are surrounded by fixed retaining shields 250 which hold the sections in their respective pockets while such sections advance along the periphery of the drum 249. Once the sections 102, 103 have advanced beyond the cam 251, they are severed by two revolving disk-shaped cutters 252, 253 which form the outer filters 104, 107 and the intermediate sections 105, 106 (see the step C in FIG. 1). Two additional fixed spreading or shifting cams 254, 255 are located in the path of filters and sections which have advanced past the cutters 252, 253 and serve to shift the sections 105, 106 away from the filters 104, 107 so as to form a gap 101b and two gaps 101c shown at D in the upper part of FIG. 1. Of course, the shields 250 allow the sections to move axially and away from each other but hold such sections against radial or other movements with reference to the cutting drum 249. Therefore, the cams 251, 254, 255 must extend into the spaces between the shields 250 in order to reach such portions of the sections which extend radially outwardly from the respective axially parallel pockets in the periphery of the drum 249.

Two additional rotary disk-shaped cutters 256, 257 are mounted downstream of the cams 254, 255 and serve to form the sections 108–111 shown at E in the upper part of FIG. 1. The cutters 256, 257 are followed by two spreading or shifting cams 259, 260 which shift the sections 109, 110 inwardly and away from the sections 108, 111 (see the step F in FIG. 1) and thereby provide two additional gaps 101c of unit length. A further rotary disk-shaped cutter 258 severs the section 110 to form the sections 112, 113 (see the step G in FIG. 1) and an additional wedge-like spreading or shifting cam 261 is provided to shift the sections 112, 113 away from each other and to form the last two gaps 101c of unit length (see the step H in FIG. 1).

The lower portion of the frame member 242 carries a support 262 for a reel 263 of wrapping tape 264, this reel being rotatable in its support 263 so that it may pay out a continuous length of tape which is led around a deflecting roller 265, through the gap between an advancing roller 267 and a counter roller 266, around a resiliently mounted second deflecting roller 268, along the surface of a smoothing device 269, around a third deflecting roller 270, along a portion of a roller-shaped paste applicator 271 and to the periphery of a revolving suction conveyor or drum 273 whose peripheral speed exceeds the forward speed of the tape 264. The applicator 271 receives a continuous coat of paste from a transfer roller 272 which dips into a tank 272a containing a supply of adhesive material. The suction drum 273 cooperates with the revolving cutter of a cutting device 274 which severs the tape at regular intervals to form wrappers 114 whereby the drum 273 automatically spreads the thus obtained wrappers 114 in a manner well known in the art of wrapping apparatus for cigarettes, filter cigarettes and similar rod-shaped articles.

Each consecutive wrapper 114 is applied to one of the assemblies or groups 275 (corresponding to the assembly shown at I in FIG. 1) so that the wrapper 114 forms a connector between the filters 104, 107 and sections 108, 109, 112, 113, 111. The suction drum 273 is adjacent to the second cutting drum 249 and is located downstream of the shields 250. Such shields may continue past the drum 273, or the drum 249 may accommodate a suction chamber so that the assemblies 275 which advance past the drum 273 may be held by suction. It will be noted that, while advancing with the respective assemblies 275, the wrappers 114 are substantially tangential thereto. This is also shown at I in the lower part of FIG. 1.

The cutting drum 249 delivers the assemblies 275 (each with a wrapper 114 attached thereto) into consecutive peripheral pockets or holders of a wrapping conveyor or drum 276 which is constructed in a manner substantially as disclosed in the copending application Ser. No. 162,-431, of Bernhard Schubert, now abandoned, or in U.S. Patent No. 2,714,384 to Schubert and is capable of convoluting the wrappers 114 in a series of stages including partial convolution to form the U-shaped or V-shaped wrapper bodies 114a and complete convolution so as to transform each wrapper body 114a into a tube or cylinder. The wrappers advancing with the pockets or holders of the wrapping drum 276 are preferably held by suction. The drum 249 presses the assemblies 275 into consecutive pockets of the wrapping drum 276 so that each wrapper 114 is automatically deformed (see the wrapper bodies 114a) and transforms each gap 101c into an open-sided pocket 101e whose open side faces away from the axis of the drum 276.

The apparatus of FIG. 9 further comprises a rotary filling device 277 which is mounted on the frame member 242 at a level above the wrapping drum 276 and which serves to deliver into each pocket 101e a measured quantity of granular filter material 115. The exact construction of a device which corresponds to the filling device 277 will be described in connection with FIGS. 13 and 18. It suffices to say here that this filling device 277 receives granular filter material through a supply conduit 279 which is connected to the bottom portion of a suitable source here shown as a hopper 278. The latter may be fixed to the upper portion of the frame member 242 or it may be installed on an independent support.

Once the assemblies 275 have advanced past the lowermost portion of the filling device 277, the wrapping drum 276 completes the convolution of wrapper bodies 114a so that the assemblies 275 and the corresponding wrappers 114 are transformed into mouthpieces 116 of sextuple unit length. The mouthpieces 116 are thereupon delivered into the pockets of a testing drum 280 which test them and ejects (or marks for ejection) all defective mouthpieces. All satisfactory mouthpieces 116 are delivered into the holders of a chain conveyor 281 which delivers them onto the upper stringer of a take-off conveyor 281c so that the mouthpieces may be transported to storage or directly into a filter cigarette machine. In the latter instance, each mouthpiece 116 is severed in a manner as shown at N in the lower part of FIG. 1.

It will be noted that the filling device 277 is located between the means (cutting drum 249) for transforming the wrappers 114 into wrapper bodies 114a and the means (not shown in FIG. 9) for completely convoluting the wrapper bodies 114a around the rod-shaped members to seal the pockets 101e and to thus entrap the filter material in the resulting mouthpiece of multiple unit length. The means for completing the wrapper or convoluting step will be described in connection with FIGS. 13 to 18. The drums 249, 276 cooperate to transform the gaps 101c into open-sided pockets 101e, thereby enclosing measured quantities of filter material which are fed by the filling device 277.

Figure 10:
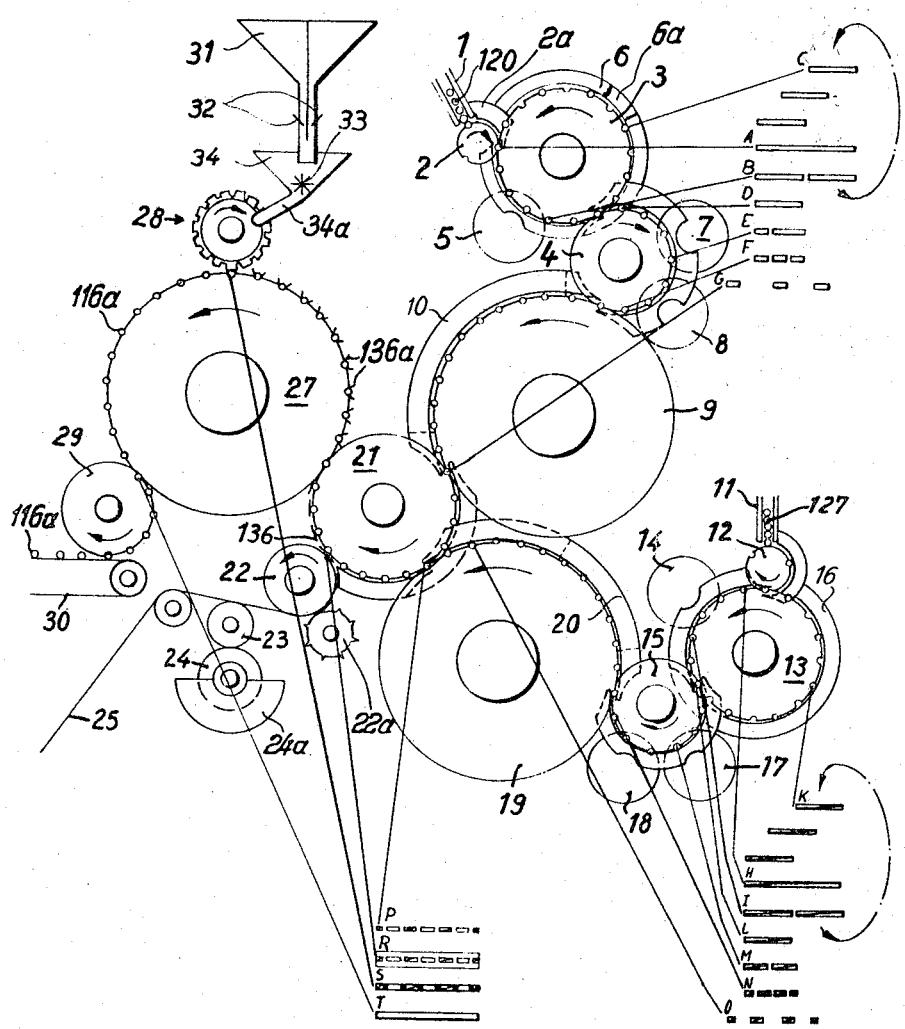
FIG. 10 is a side elevational view of a second apparatus which is used for mass production of composite mouthpieces in accordance with the method of FIG. 2.

The apparatus of FIG. 10 is used for practicing the method of FIG. 2. For convenience, the steps A, B . . . T of FIG. 2 are shown again in the upper right-hand corner and in the lower part of FIG. 10, together with reference lines which indicate such portions of the apparatus where the corresponding steps take place. A first magazine comprises a chute 1 which discharges white filter rods 120 of twelve times unit length into consecutive peripheral holders or pockets of an inserting conveyor or drum 2. The drum 2 delivers such filter rods 120 along the inner side of an arcuate shield 2a and onto consecutive peripheral pockets or holders of a cutting conveyor or drum 3 surrounded by shields 6 and serving to advance the filter rods past a rotary disk-shaped cutter 5 which severs the rods to form the sections 121, 122. It will be noted that the inserting drum 2 delivers white filter rods 120 into each second pocket of the cutting drum 3 and that this drum comprises an odd number of pockets. The sections 121 are immediately delivered into alternate pockets of a second cutting drum 4 and the sections 122 travel upwardly along an inclined cam 6a which shifts them axially so that they occupy spaces which were occupied by corresponding sections 121. In other words, the sections 122 travel with the cutting drum 3 through more than one full revolution. Consequently, each of the pockets intermediate the transfer station between the drums 2, 3 and the transfer station between the drums 3, 4 accommodates at least one section whereby the sections 122 alternate and form a single file with the sections 121. Of course, the sections 122, travelling with the cutting drum 3, will bypass the cutter 5 because they form with the sections 121 a single file. This means that each consecutive pocket of the cutting drum 4 receives a section 121 or 122 of sextuple unit length.

The drum 4 advances such sections past a pair of rotary disk-shaped cutters 7, 8 which sever the sections 121, 122 and form the sections 123, 124, 125. The groups of consecutively formed sections 123–125 of double unit length are transferred into the pockets of a spreading drum 9 which may be of the type shown in FIG. 11 of U.S. Patent No. 3,039,367 to Seltzer and serves to form between the sections gaps 120a of quadruple unit length (see the step G in FIG. 2). The wedge-shaped cams 10 serve as a means for shifting the sections 123, 125 axially and away from the corresponding sections 124. The thus arranged rows of coaxial sections 123–125 are thereupon delivered into the pockets of an assembly conveyor or drum 21.

The apparatus of FIG. 10 further comprises a second magazine whose chute 11 discharges black filter rods 127 of twelve times unit length so that such rods enter consecutive peripheral pockets or holders of an inserting conveyor or drum 12 which transfers the rods into alternate pockets of a cutting conveyor or drum 13. The drum 13 is a functional equivalent of the cutting drum 3 and advances the rods 127 past a rotary disk-shaped cutter 14 whereby each rod yields two sections 128, 129 of sextuple unit length. The sections 128 enter immediately the pockets of a second cutting drum 15 but the sections 129 continue to rotate with the drum 13 and are shifted axially by an inclined cam 16 so that such sections 129 and the sections 128 form a single file along that portion of the drum 13 which extends from the cutter 14 to the transfer station between the drums 13, 15. The single file of alternating sections 128, 129 in the pockets of the cutting drum 15 is advanced past a first rotary disk-shaped cutter 17 and thereupon past a pair of coaxial rotary disk-shaped cutters 18 which sever each section 128, 129 so that each such section yields a pair of black filters 132, 135 and a pair of black sections 133, 134 of double unit length. The groups of sections 133, 134 and filters 132, 135 are transferred into peripheral holders or pockets of a spreading conveyor or drum 19 which corresponds to the drum 9 and cooperates with suitable wedge-like cams 20 to shift the sections 133, 134 and filters 132, 135 axially and away from each other and to form gaps 127a shown at O in the lower part of FIG. 2. The cams 10 and 20 are preferably provided with suitably inclined cam faces so that each thereof comes in mere linear contact with the corresponding filters and/or sections. Furthermore, the mounting of the cams 10, 20 is preferably such that they engage the end faces of filters and/or sections at a distance from the periphery of the spreading drum 9 or 19 which approximates the radius of a filter rod 120 or 127. Such configuration and mounting of the cams 10, 20 will insure that the comparatively short filters 132, 135 will not overturn at the time they are caused to move axially and away from the black sections 133, 134. In order to further reduce the likelihood of overturning, the outer end faces of the filters 132, 135 (in the positions shown at O in the lower part of FIG. 2) are moved in abutment with suitable stop disks provided at the axial ends of the spreading drum 19 and with similar stop disks at the axial ends of the assembly drum 21.

It goes without saying that the spreading drums 9, 19 may be replaced by other types of spreading devices, for example, by spreading devices which are constructed in a manner shown in the copending application Serial No. 153,926, of Willy Rudszinat. Such spreading devices comprise a series of disks which are mounted to rotate in mutually inclined planes and have peripheral pockets or holders which move away from each other beginning at a first transfer point where the sections are delivered thereto and terminating at a second transfer point where the sections are transferred on to another conveyor, in the present instance, to the assembly drum 21.

Each pocket of the assembly drum 21 receives a group of white sections 123–125 in positions as shown at G and a group of black filters 132, 135 and black sections 133, 134 as shown at O so that such filters and sections are shuffled or interdigitated to form an assembly corresponding to one which is shown at P in the lower part of FIG. 2. In other words, each pair of adjacent sections or filters and sections is separated by a gap 127b of unit length.

The assemblies of black and white sections and black filters which travel with pockets of the assembly drum 21 are connected with wrappers 136 which are delivered by a suction drum 22 corresponding to the suction drum 273 of FIG. 9. This suction drum 22 cooperates with a rotary cutter 22a which severs a tape 25 after the tape has been coated with a layer of adhesive material while in contact with a rotary applicator 23. The applicator cooperates with a transfer roller 24 which dips into a tank 24a. The assembly drum 21 thereupon delivers the assemblies (with the wrappers 136 attached thereto) into consecutive peripheral pockets or holders of a wrapping conveyor or drum 27 which corresponds to the wrapping drum 276 of FIG. 9. During transfer into the pockets of the wrapping drum 27, the wrappers 136 are transformed into substantially U-shaped or V-shaped wrapper bodies 136a whereby each gap 127b forms a pocket 127c to receive a measured quantity of granular filter material 115 from a rotary filling device 28 corresponding substantially to the filling device 277 of FIG. 9. The wrapping drum 27 then completes the convoluting step whereby each wrapper body 136a forms a tube and the thus obtained rod-shaped mouthpieces 116a of sextuple unit length are transferred into the holders of a revolving drum-shaped testing device 29 which delivers satisfactory mouthpieces onto the upper stringer of a take-off conveyor belt 30.

In the apparatus of FIG. 10, the filling device 28 discharges a granular filter material which is a mixture of two granular substances. Therefore, the filling device cooperates with a hopper 31 whose interior is divided in two compartments whereby each compartment contains a supply of different granular material. The downwardly extending spout of the hopper 31 defines two passages each of which is controlled by a valve 32. These valves discharge measured quantities of respective granular materials, and such materials enter a funnel-shaped mixing device 34 provided with a mixing wheel 33 which insures that the two materials are thoroughly intermixed prior to being allowed to descend through a supply conduit 34a and into the filling device 28. It will be readily understood that the hopper 31 may be replaced by one which is provided with three or more separate compartments each of which may receive a different granular filter material.

Referring to FIG. 11, the apparatus therein shown is utilized for practicing the method of FIG. 6. A magazine comprises a chute 285 which discharges white filter rods 165 of eight times unit length and such rods are admitted into consecutive peripheral pockets or holders of a cutting conveyor or drum 286. The drum 286 cooperates with a first rotary disk-shaped cutter 287 which severs the rods 165 to form pairs of coaxial sections 166, 167 of quadruple unit length, and such sections are thereupon severed by cutters 288, 289 to respectively yield white sections 168, 169 and 170, 171 of double unit length. The cutting drum 286 then delivers rows of coaxial sections 168–171 into the pockets of a staggering device 290 which includes four eccentric disks operating in a manner as disclosed in the aforementioned application Serial No. 153,926, of Willy Rudszinat, and serving to stagger the sections 168–171 in a manner as shown at D in FIG. 6. The disks of the staggering device 290 rotate at the same speed and deliver the sections 168–171 into consecutive pockets of an aligning conveyor or drum 291 which cooperates with arcuate cams 292 so as to shift the sections axially and to arrange them in a single file (see the step E in FIG. 6). The manner in which the aligning drum 291 cooperates with the cams 292 is also disclosed in the application Serial No. 153,926, of Rudszinat. It will be noted that each disk of the staggering device 290 comprises a series of axially parallel peripheral pockets whereby the number of pockets on each disk exceeds by one or is less by one than the number of pockets on the adjacent disk. One pocket of each disk is aligned with a pocket of each other disk at the time such pockets are adjacent to the transfer station between the cutting drum 286 and staggering device 290.

The aligning drum 291 is followed by two transfer conveyors or drums 293, 294 which serve to increase the distance between the sections 168–171, and the second transfer drum delivers the sections into consecutive peripheral pockets or holders of a shuffling conveyor or drum 296. This shuffling drum also cooperates with a supply drum 295 which delivers into its pockets pairs of coaxial but spaced tobacco rods 172, 173 (hereinafter called cigarette rods). The length of the gap between the inner ends of cigarette rods 172, 173 is the same as shown at 172a in the step F of FIG. 6, and the transfer drum 294 delivers white sections of double unit length in a manner as shown at G so that each section forms with the corresponding pair of cigarette rods 172, 173 two gaps 172b of unit length. The shuffling drum 296 delivers assemblies of cigarette rods and white sections into consecutive pockets of an assembly drum 297 which cooperates with a suction drum 302. The suction drum 302 serves as a counter drum for a rotary cutter wheel 301 which severs a continuously advancing wrapping tape 298 after the tape has moved past a roller-shaped applicator 299 which receives a layer of paste from transfer roller 300 dipping into a paste tank 300a. The thus obtained wrappers 174 are applied to consecutive assemblies of cigarette rods and white filter sections (see the step H in FIG. 6) and the assembly drum 297 discharges the wrappers 174 and all rod-shaped parts adhering thereto into consecutive pockets of a wrapping conveyor or drum 303 whereby each wrapper 174 automatically forms a U-shaped or V-shaped wrapper body 174a and transforms the gaps 172b into pockets 172c of unit length.

The apparatus of FIG. 11 further comprises a filling device 304 which is located at a level above the wrapping drum 303 and serves to admit into the pockets 172c measured quantities of granular filter material to form the granular filters 115a (see the step I in FIG. 6). The filling device 304 receives granular material from a hopper 88 through a supply conduit 87. The wrapping drum 303 then completes the convolution of adhesive-coated wrapper bodies 174a to form filter cigarettes 175 of double unit length. Such cigarettes 175 are delivered into the pockets of a cutting drum 305 which cooperates with a rotary disk-shaped cutter 306 to sever each cigarette 175 into two coaxial filter cigarettes 176, 177 of unit length. The cigarettes 176, 177 are deposited on the upper stringer of a take-off conveyor belt 307.

If the filling device 304 (together with the supply conduit 87 and hopper 88) is omitted, or if the filling device 304 is arrested, the apparatus of FIG. 11 will produce filter cigarettes without granular filters 115a. Thus, each filter cigarette will comprise a tobacco rod 172 or 173, a fibrous filter 168a, and an air-filled pocket 172c which is located between the inner end of the tobacco rod and the filter 168a.

Also, if the filling device 304 is omitted and the apparatus of FIG. 11 comprises suitable cams (located past the transfer drum 294) which move the cigarette rods 172, 173 in actual abutment with the end faces of the white section 168, the apparatus will produce conventional filter cigarettes with mouthpieces consisting of a single fibrous filter 168a. Thus, it will be seen that the apparatus of our invention may be readily converted to produce different types of mouthpieces and/or smokers' products.

Figure 12:
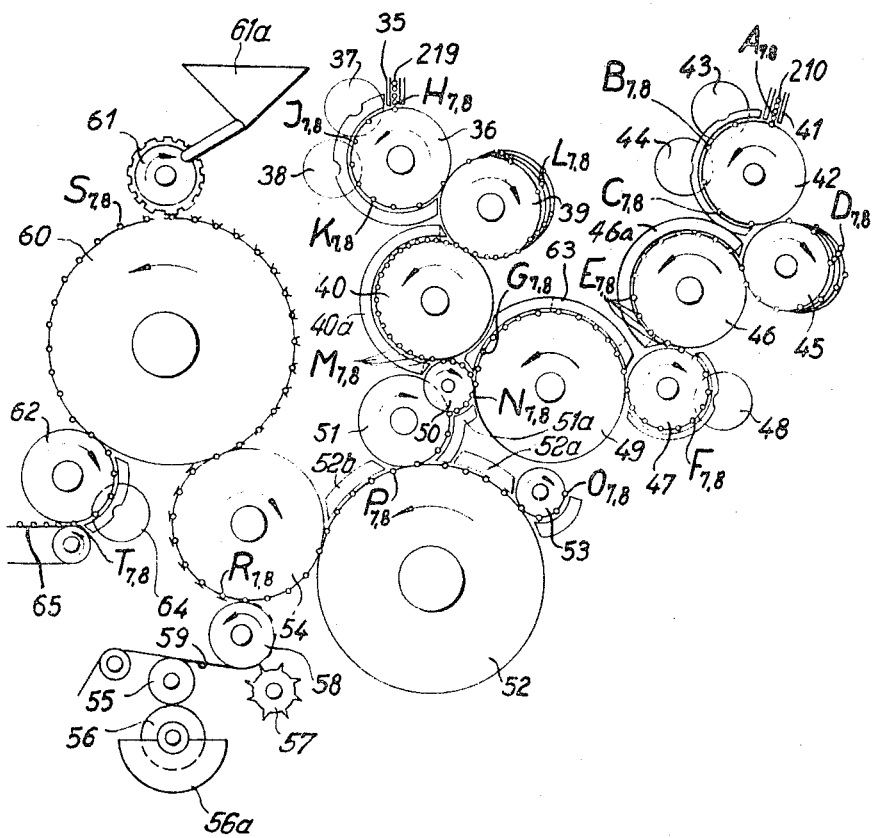
FIG. 12 is a side elevational view of a fourth apparatus which is utilized for mass production of filter cigarettes in accordance with the method of FIG. 7 or 8.

The apparatus of FIG. 12 is utilized for practicing the method of FIG. 7 or 8. The reference characters $A_{7, 8}$, $B_{7, 8}$ . . . $T_{7, 8}$ indicate such parts of the machine where the corresponding steps A, B . . . T shown in FIGS. 7 and 8 are completed. A first magazine comprises a chute 35 which discharges black filter rods 219 of eight times unit length so that each rod enters one of several axially parallel peripheral pockets or holders on a cutting conveyor or drum 36 which cooperates with a first cutter 37 serving to sever the rods 219 into sections 219a, 219b of quadruple unit length, and with two additional cutters 38 which sever the sections 219a, 219b to form sections 220, 221 and 222, 223 of double unit length. Such sections are then delivered to a staggering device 39 which corresponds to the staggering device 290 of FIG. 11 and moves the originally coaxial sections 220–223 transversely with reference to each other so as to deliver them into consecutive pockets of an aligning drum 40 cooperating with arcuate cams 40a which cause the sections 220–223 to form a single file (see the step M in FIG. 7 or 8).

A second magazine comprises an inclined chute 41 which feeds white filter rods 210 of eight times unit length into consecutive pockets of a cutting conveyor or drum 42. The drum 42 advances the rods 210 past a first rotary disk-shaped cutter 43 which forms the sections 211, 212, and thereupon past a pair of coaxial cutters 44 which sever the sections 211, 212 to form the sections 213, 214 and 215, 216 of double unit length. The thus obtained rows of coaxial sections 213–216 are delivered to a staggering device 45 (corresponding to the device 39) which performs the step shown at D in FIG. 7 or 8 and delivers the staggered sections into consecutive pockets of an aligning drum 46 cooperating with arcuate cams 46a to form a single file of white sections (see the step E in FIG. 7 or 8). The white sections are delivered into consecutive pockets of a cutting conveyor or drum 47 which cooperates with a cutter 48 to sever each section into a pair of white filters 217, 218 of unit length. The thus obtained pairs of filters 217, 218 are delivered into consecutive pockets of a shifting or spreading conveyor in the form of a drum 49 which cooperates with a wedge-like cam 63 to move the filters away from each other and to form the gaps 217a (see the step G in FIG. 7 or 8). The spreading drum 49 delivers the filters 217, 218 into consecutive pockets of a shuffling conveyor or drum 50 which also receives black sections 220–223 from the aligning drum 40 so that each pocket of the shuffling drum 50 receives an assembly of the type shown at N. The drum 50 delivers such assemblies into consecutive pockets of a transfer conveyor or drum 51 which feeds them into consecutive pockets of a second shuffling conveyor or drum 52. The drum 52 receives pairs of coaxial cigarette rods 224, 225 from a supply drum 53 whereby the pairs of cigarette rods 224, 225 are spaced from each other to form gaps 217c or 217c' not later than at the time such pairs of cigarette rods reach the transfer station between the drums 51, 52. This enables the drum 51 to insert assemblies of filters and filter sections into the gaps between consecutive pairs of coaxial cigarette rods 224, 225 and to form assemblies of the type shown at P in FIG. 7 or 8. The cigarette rods 224, 225 may be moved apart at a point upstream of the shuffling drum 52 or while advancing with this shuffling drum, i.e., the parts 52a shown in FIG. 12 may constitute spreading cams which will move the cigarette rods apart in a zone located just ahead of the transfer station between the drums 51, 52.

The shuffling drum 52 delivers the contents of its pockets into consecutive pockets or holders of an assembly conveyor or drum 54 which cooperates with a suction drum 58. The latter serves as a counter drum for a rotary cutter wheel 57 to sever a continuous length of wrapping tape 59 which is coated with adhesive while advancing along an applicator 55 which receives paste from a transfer roller 56 dipping into a tank 56a. The wrappers 226 or 231 adhere to the respective assemblies and advance therewith into consecutive pockets of a wrapping conveyor or drum 60 whereby each wrapper automatically forms a U-shaped or V-shaped wrapper body which defines pockets for reception of granular material from a filling device 61 which is fed from a hopper 61a. Of course, if the apparatus of FIG. 12 is used for practicing the method of FIG. 7, the filling device 61 will admit two streams of granular material so as to introduce measured quantities of such material into the pockets 217b shown at P in FIG. 7. On the other hand, and if the apparatus of FIG. 12 is used for practicing the method of FIG. 8, the filling device 61 will deliver four streams of granular material each time one of the U-shaped wrapper bodies 231a is located at the top of the wrapping drum 60.

The wrapping drum 60 delivers filter cigarettes of double unit length to a cutting drum 62 which cooperates with a rotary disk-shaped cutter 64 to sever each such cigarette into a pair of filter cigarettes 229, 230 or 237, 238 of unit length. Such cigarettes are delivered to the upper stringer of a take-off belt 65.

If the apparatus of FIG. 12 is used for practicing the method of FIG. 7, the cams 52a will move the cigarette rods 224, 225 away from each other through distances corresponding to the length of the gap 217c shown at O in the lower part of FIG. 7. Alternatively, the shields 52a may serve to form the gaps 217c' of FIG. 8 and the apparatus then comprises a pair of additional cams 52b (located downstream of the drum 51) which serve to move the cigarette rods 224, 225 axially of and toward each other so as to shorten the gap 217c' and to transform it into the gap 217c which is just long enough to accommodate the assembly shown at N in the lower part of FIG. 7.

If the apparatus of FIG. 12 is used to provide cigarette rods 224, 225 with mouthpieces including the assemblies shown at N' in FIG. 8, the cams 51a shown in FIG. 12 adjacent to the drum 51 may be used to move the filters 217, 218 into abutment with the corresponding black sections (220-223) of double unit length, and the cams 52a will then form gaps corresponding to the gap 217c in FIG. 7. The filling device 61 then admits two streams of granular filter material each time a U-shaped wrapper body 231a reaches the top of the wrapping drum 60.

FIGS. 13 to 18 illustrate the filling device 304 for the apparatus of FIG. 11. This filling device cooperates with and is located at a level directly above the wrapping drum 203. Its construction is analogous to that of the filling device 277 shown in FIG. 9, of the filling device 28 shown in FIG. 10, or of the filling device 61 shown in FIG. 12; therefore, it suffices to describe only one of these filling devices.

Referring to FIGS. 13 and 14, the filling device 304 comprises a stationary inner member 66 which resembles a horizontal cylinder (hereinafter called stator) and which is surrounded by a cylindrical outer member or sleeve 67 (hereinafter called rotor). The rotor 67 is coaxial with and is mounted to rotate about the stator 66. It comprises a cylindrical wall or mantle 68 and an end wall 69 provided with a cylindrical hub 70. The hub 70 is rotatable about a horizontal supporting shaft 71 which is fixed to the frame of the apparatus shown in FIG. 11. For example, the shaft 71 may be fixed to an upright wall-like frame member similar to the member 242 shown in FIG. 9.

The mantle 68 of the rotor 67 is provided with radially extending bores 72 each of which constitutes a measuring compartment in that it may accommodate a measured quantity of granular filter material such as is necessary to fill one of the pockets 172c (see FIG. 6, step I). FIGS. 13 and 14 show that the mantle 68 is provided with rows of bores 72 each of which includes two bores. In the filling device 28 of FIG. 10, each row comprises six bores 72 so that each bore may discharge granular filter material into one of the six pockets 127c provided in any given U-shaped wrapper body 136a (see the step S in FIG. 2). The outer ends (discharge ends) of each row of bores 72 may be sealed or exposed by axially reciprocable slide bars 73 (hereinafter called sliders) which are guided in U-shaped rails 74 fixed to the periphery of the mantle 68. The sliders 73 have bores 75 which may be moved into or out of registry with the corresponding bores 72, depending on the axial position of the sliders. Similar bores 76 are provided in the rails 74, and each bore 76 registers with one of the bores 72 so that, when the sliders 73 are moved to positions in which their bores 75 register with the corresponding bores 72 and 76, a granular filter material may be discharged from the interior of the rotor 67 to flow into the momentarily aligned pockets 172c. If the rails 74 do not extend along the full length of the mantle 68, the bores 76 may be dispensed with.

FIG. 14 shows a supporting sleeve 77 which surrounds the shaft 70 and is secured thereto by one or more radial screws 78. This sleeve has been indicated by phantom lines so as not to conceal the structure which is mounted behind it. A flange 77a of the sleeve 77 is fixed to and supports the stator 66. The latter comprises a cylindrical head 79 and an extension 80 which is sealingly surrounded by the mantle 68 of the rotor 67. The extension 80 comprises cylindrical or disk-shaped end walls which are in sealing engagement with the internal surface of the mantle 68, and a median portion which is provided with one or more cutouts so as to define with the mantle an internal chamber 81 which accommodates a supply of granular filter material. The chamber 81 accommodates two axially extending stirrers or agitators each of which comprises a driven shaft 82, 83 and a series of radially extending blades, paddles or pins. The ends of the shafts 82, 83 extend through and beyond the head 79 and carry pulleys which are driven by endless belts 84, 85. These belts are trained around the hub 70 which serves as a driver pulley and rotates the shafts 82, 83 when the rotor 67 rotates. The head 79 of the stator 66 is provided with a passage 86 which is connected to the discharge end of the supply conduit 87. The conduit 87 receives flowable pulverulent or granular filter material from the hopper 88 or from a similar source.

The outer side of the end wall 69 on the rotor 67 carries a ring gear 89 which is bolted to the rotor and meshes with a bevel gear 91 provided at the upper end of a vertical drive shaft 90. The ends of the shaft 90 are rotatable in bearing brackets 92, 93 which are fixed to the machine frame, not shown. The lower portion of the shaft 90 carries a second bevel gear 94 which meshes with a ring gear 95 concentrically secured to one end face of the wrapping drum 303. Thus, the rotor 67 will be compelled to rotate in response to rotation of and in synchronism with the drum 303.

FIG. 13 shows certain component parts of a device 96 which serves to move the sliders 73 to their open positions. This device 96 comprises a disk-shaped carrier 97 which is reciprocable on a smaller-diameter portion of the drive shaft 90 and is provided with a circumferential groove. The underside of the carrier 97 is connected with a triangular plate 98 each corner of which supports a motion transmitting roller 99. The carrier 97 and the plate 98 are free to move axially of but cannot rotate with reference to the shaft 90; thus, when the shaft 90 rotates to drive the rotor 67, the plate 98 is also compelled to rotate and its rollers 99 will shift consecutive sliders 73 in a direction to the right, as viewed in FIG. 13, in order to move the bores 75 in registry with the corresponding bores 72 (mantle 68) and 76 (rails 74).

The device 96 further comprises a horizontal shaft 400 which is fixed to the frame of the apparatus and serves as a fulcrum for a two-armed lever 401. This lever comprises a shorter arm 402 which extends into the circumferential groove of the carrier 97 and a longer arm which is used as a handle. When the lever 401 is rocked in a clockwise direction, as viewed in FIG. 13, the carrier 97 is shifted along the drive shaft 90 in a direction toward the axis of the wrapping drum 303 so that the rollers 99 are moved out of registry with the sliders 73 and the sliders cannot be moved to open positions. The lever 401 will be rocked in a clockwise direction when the apparatus is idle and the filling device 304 should not discharge any granular filter material.

FIG. 14 shows that the head 79 of the stator 66 supports a bracket 403 for a roller 404 which is angularly displaced with reference to the plate 98 and serves to move the sliders 73 to closed positions. The angular position of the roller 404 (with reference to the rollers 99) is such that the sliders 73 will be moved to closed positions shortly after they were shifted by one of the rollers 99 so that the contents of the corresponding bores 72 were evacuated into the pockets 172c.

Referring again to FIG. 13, the periphery of the wrapping drum 303 is provided with axially parallel concave pockets or holders 405 which may receive pairs of axially spaced cigarette rods 172, 173, a filter rod section 168, and a U-shaped or V-shaped wrapper body 174a. Each pocket 405 is flanked by two wrapping members or flaps 409, 410 (see FIGS. 15–18) which may be manipulated by means of control rods 411 and roller followers 412. The followers 412 track the face of a fixed cam 413 which is adjacent to the right-hand end face of the wrapping drum 303. The manner in which the flaps 409, 410 cooperate to complete the convoluting step is illustrated in FIGS. 15 to 18 and the operation of these flaps is analogous to that disclosed in U.S. Patent No. 2,714,384 to Schubert. Each of FIGS. 15 to 18 shows the lower portion of the cylindrical extension 80 of the stator 66, the adjacent portion of the mantle 68, one of the rails 74 with a bore 76, a portion of the wrapping drum 303, and a pair of cooperating flaps 409, 410.

FIG. 15 illustrates one of the concave pockets or holders 405 in transverse section, and this pocket accommodates an assembly including a white filter section 168 of double unit length and a substantially U-shaped or V-shaped wrapper body 174a. The flaps 409, 410 for this pocket 405 are retracted into the wrapping drum 303 so that the longitudinally extending marginal portions of the wrapper body 174a extend tangentially and away from the section 168 whereby the wrapper defines with this section and with the corresponding pair of cigarette rods 172, 173 two pockets 172c (see the Step I in FIG. 6) which are ready to receive granular filter material 115.

The filling device 304 of FIGS. 13 to 18 operates as follows:

The hopper 83 discharges granular filter material 115 which is conveyed through the supply conduit 87 and flows into the chamber 81. The main drive of the apparatus rotates the wrapping drum 303 in a clockwise direction, as viewed in FIG. 13 (see the arrow 1412) whereby the shaft 90 compels the rotor 67 to rotate in a counterclockwise direction (arrow 1413). The filter material which is contained in the chamber 81 descends into such bores 72 of the mantle 68 which are located in the lower part of the rotor 67 and the corresponding sliders 73 are closed because they have advanced past the roller 404. The shafts 82, 83 of the agitating device are driven by the belts 84, 85 so that each bore 72 in the region beneath the agitating device is automatically filled to capacity to accommodate a measured quantity or filling of such granular material. An important advantage of the agitating device is that it loosens and thus prevents bridging of granular material, particularly if this material consists of comparatively coarse particulate matter.

The extension 80 of the stator 66 comprises a horizontally extending metering edge portion 422 (see FIG. 15) which acts not unlike a doctor blade and scrapes off surplus granular material 115 so that each bore 72 which has advanced past the edge portion 422 contains the same quantity of granules. When a slider 73 reaches or approaches its lower end position (see FIG. 15) one of its ends is engaged by a roller 99 and the slider begins to move axially so as to expose the corresponding bores 72 and to allow accurately measured quantities of granular filter material 115 to flow through the bores 73 and 76 so that such material begins to descend into the momentarily aligned pockets 172c. The opening of sliders 73 is preferably gradual and the discharge of granular material 115 may take up some time while the corresponding slider 73 advances through the positions shown in FIGS. 16 and 17, i.e., while the bores 76 are still located substantially above the corresponding pockets 172c and between the longitudinally extending marginal portions of the wrapper body 174a.

The wrapping drum 303 rotates in synchronism with the filling device 304 and the cam 413 compels the followers 412 and control rods 411 to move the flaps 409, 410 radially outwardly (see FIGS. 16 and 17) whereby the marginal portions of the wrapper body 174a begin to move toward each other. Once the bores 72 have discharged their contents (in or shortly past the position shown in FIG. 17), the slider 73 is engaged by the roller 404 and moves to closed position (see FIG. 18) and the flaps 409, 410 continue to convolute the wrapper body 174a to transform this wrapper body into a tube 174b (see the step K in FIG. 6) whereby the assembly which is accommodated in the pocket 405 forms a filter cigarette 175 of double unit length having a mouthpiece of double unit length. The measured quantities of granular material are fed by gravity flow (because the corresponding bores 72 are then located in the lower part of the mantle), by centrifugal force (because the mantle rotates), and in admixture with compressed air. The manner in which the feed of granular material is assisted by blasts of compressed air will be described later.

The flaps 409, 410 comprise several articulately connected portions which are manipulated in a manner as disclosed in the aforementioned Schubert Patent No. 2,714,384. FIG. 17 shows that the flap 409 is caused to move radially outwardly slightly ahead of the flap 410 so that the left-hand marginal portion of the wrapper body 174a is folded ahead of the right-hand marginal portion. Such operation of the flaps 409, 410 insures that the marginal portions are neatly folded over each other. In addition, and since the flap 409 is located ahead of the flap 410 (as seen in the direction in which the wrapping drum 303 rotates), the left-hand marginal portion of the wrapper body 174a (which is folded ahead of the right-hand marginal portion) serves as a barrier to prevent spillage of granular material as the pocket 405 begins to move downwardly through and beyond the positions of FIGS. 17 and 18. It will be noted that the filters 115a form substantially cylindrical plugs because each such filter contains a sufficient quantity of granular filter material to completely fill the corresponding pocket. However, and as mentioned before, it is also possible to provide the mantle 68 with bores 72 of reduced volume so that each pocket 172c is only partially filled when the wrapping step is completed.

FIGS. 15 to 18 further show a channel 414 which is provided in the underside of the extension 80 (to the left of the edge portion 422). This channel 414 is connected to a duct 1411 (see FIG. 14) which communicates with the pressure side of an air compressor 1411a or another source of compressed air. Such air is admitted at a pressure which is preferably only slightly above atmospheric pressure and serves to accelerate the discharge of granular material from the bores 72 so that the wrapping drum 303 may be rotated at higher speed.

The lever 401 is actuated to move the plate 98 and the rollers 99 out of the path of the sliders 73 whenever the operator detects that the apparatus produces defective filter cigarettes. Thus, the feed of granular material may be interrupted whenever necessary independently of the operation of the remaining parts of the apparatus. Of course, the lever 401 may be rocked in a fully automatic way, for example, by an electromagnet which is controlled by a testing device for filter cigarettes. Such testing device (which may correspond to the testing device 280 of FIG. 9) can be mounted ahead of or past the cutter drum 305 shown in FIG. 11. Alternatively, the testing device may be located ahead of the filling device 304 and is then constructed to detect the absence of wrappers 174, of filter sections 168–171 and/or of cigarette rods 172, 173. If the testing device detects an incomplete assembly, it actuates the lever 401 to interrupt the feed of filter material. Also, the testing device may produce a readily detectable signal to warn the operator that the operation of the apparatus is unsatisfactory.

Referring finally to FIG. 19, there is shown a modified filling device 469 which is utilized for feeding pellet-shaped filters 473 of unit length. Such pellet-shaped filters may consist of activated charcoal granules bonded to each other by suitable adhesive which allows tobacco smoke to pass through the pellet. The bonding agent unites a measured quantity of charcoal granules into solid cylindrical filter of unit length. The filling device 469 is illustrated above a partially convoluted substantially U-shaped wrapper body 471 which accommodates an assembly of rod-shaped articles including three spaced but coaxial filter sections 470 of double unit length and two outer filters 470a of unit length. For example, the sections 470 and filters 470a may consist of Estron fibers. The pockets 472 between the adjacent sections 470 or filters 470a and sections 470 are of unit length or slightly more so that each thereof may accommodate a pellet-shaped filter 473.

The filling device 469 comprises a horizontal conveying trough 474 which contains a row of coaxial pellet-shaped filters 473, four downwardly extending chutes 475, 476, 477, 478 each having a discharge end which registers with one of the pockets 472, a pusher 474a which is reciprocable longitudinally of the trough 474, and a horizontal crosshead 479 having four downwardly extending plungers 480, 481, 482, 483 which are aligned with the chutes 475–478. The crosshead 479 is reciprocated in synchronism with the operation of the wrapping drum (not shown) which supports the wrapper body 471 so as to descend whenever the pockets 472 are partially or fully aligned with the discharge ends of the corresponding chutes. Each chute contains a retaining member in the form of a leaf spring 484 which biases the lowermost pellet-shaped filter 473' against the opposed wall of the corresponding chute to prevent uncontrolled escape of such filters. It will be noted that each chute is filled with filters 473 above the respective retaining spring 484.

The filling device 469 operates as follows:

When the pockets 472 are substantially or fully aligned with the discharge ends of the chutes 475–478, the crosshead 479 descends and its plungers 480–483 transfer four filters 473 from the trough 474 into the upper portions of the corresponding chutes. The pressure transmitted by the plungers 480–483 overcomes the bias of the springs 484 so that the lowermost filters 473' enter the corresponding pockets 472. At the same time, the plungers 480–483 advance the next four filters 473 into engagement with the retaining springs 484. The flaps of the wrapping drum then complete the wrapping step in a manner as described in connection with FIGS. 15–18, and the crosshead 479 is lifted to move the lower end portions of the plungers 480–483 above the trough 474 so that the pusher 474a may perform a working stroke and will condense the row of filters 473 in the trough. A suitable hopper or the like feeds fresh filters 473 in front of the pusher 474a when the latter is moved to its retracted position so that the trough 474 may be filled with pellet-shaped filters whenever the pusher moves in the direction indicated by the arrow 474b.

The upper end portions of the chutes 475–478 preferably diverge conically toward the bottom portion of the trough 474 to facilitate the transfer of filters 473. The trough 474 is shown in the form of a U-shaped body.

In certain instances, the filling device 469 of FIG. 19 may be utilized to deliver rod-shaped filters which consist of fibrous material, and such filters will be fed into the pockets 472. Also, the filling device 469 may be used to deliver outer filters, such as the filters 470a, and is then placed ahead of a filling device of the type shown in FIGS. 13–18.

It goes without saying that the filling device 469 may be provided with two, three, five or more chutes, depending on the number of pockets in the wrapper bodies which are supported by the wrapping drum. Thus, if the filling device 469 is to replace the filling device 304 of FIGS. 13–18, it will be provided with two chutes and two plungers. The operative connection between the crosshead 479 and the drive mechanism for the wrapping drum is indicated by a double-headed arrow 479a. This connection insures that the movements of the plungers 480–483 are synchronized with the movement of the wrapping drum.

In summation, it will be noted that the methods of our invention (or, better to say, various embodiments of our method) may be divided in two main groups one of which includes arranging two or more rod-shaped articles or parts in such a way that the articles form an assembly wherein a gap remains between each pair of adjacent coaxial particles. This form of our method is shown, for example, in FIG. 6 wherein the length of the gap 172a between the cigarette rods 172, 173 exceeds the length of the white filter section 168 which is placed therebetween so that the section 168 and the cigarette rods 172, 173 form two gaps 172b of unit length. In presently utilized filter cigarette machines, the gaps 172b are eliminated by moving the cigarette rods in actual abutment with one or more interposed filters or filter sections whereby the filters, filter sections and cigarete rods form a composite rod without any gaps therebetween. One such conventional machine is disclosed in U.S. Patent No. 2,821,201 to Brunswig. The situation is similar in certain recent types of mouthpiece making machines; see, for example, U.S. Patent No. 3,039,367 to Stelzer which discloses a machine for producing multiple filter rods whose sections are in actual abutment with each other.

In accordance with the present invention, at least some gaps between adjoining outer filters, filter sections and tobacco rods are not eliminated but (a) may remain empty (i.e., they will be filled with air) so as to form mouthpieces with recessed ends or with spaces between adjoining filters and/or between the filters and the tobacco rods, (b) may be filled at least in part with granular filter material, (c) may be filled at least in part with pelletized granular filter material, (d) may be filled at least in part with rod-shaped plugs of fibrous filter material, or (e) may be filled at least in part with two or more such materials. Also, and as shown at N' in FIG. 8 of the drawings, some but not all gaps may be eliminated after two or more rod-shaped articles were shuffled to form an assembly which constitutes a multiple-length mouthpiece or a rod-shaped smokers' product of multiple unit length.

Another group of our improved methods comprises moving the sections, filters and/or tobacco rods of an assembly of coaxial articles or parts away from each other so as to form one or more gaps which may receive granular, pelletized or rod-shaped filter material, or to form gaps which remain empty after the wrapper is fully convoluted around the assembly. One such method is illustrated in our FIG. 1 wherein one starts with a filter rod 101 of twelve times unit length and ultimately arrives at a mouthpiece 116 of sextuple unit length. The length of the mouthpiece 116 equals the length of the filter rod 101 plus the combined length of six gaps 101c. Thus, each in this second group of methods includes the step or steps of moving two or more coaxial articles away from each other so as to develop one or more gaps which may form empty pockets, pockets filled at least in part with granular filter material, pockets filled at least in part with pelletized filter material, and/or pockets filled at least in part with rods or plugs of filter material.

It is further to be noted that the wrapping drum 303 shown in FIGS. 11 and 13 may be replaced by wrapping drums of the type disclosed in the application Ser. No. 162,431, of Bernhard Schubert, or an equivalent wrapping device which is capable of forming substantially U-shaped or V-shaped wrapper bodies.

Finally, we wish to mention that the method of our invention may be practiced with advantage by utilizing filter cigarette machines or mouthpiece making machines of the type wherein the rod-shaped articles advance axially rather than transversely as shown in FIGS. 9–12. Also, the drum-shaped conveyors shown in FIGS. 9–14 may be replaced by conveyors which comprise endless chains, endless belts, multiple chains or belts and the like. All that counts is to insure controlled advance of rod-shaped articles past a series of stations at which the articles are treated and manipulated in a manner as described in connection with FIGS. 1 to 8.

At the filling station of the filling devices 304 and 469 which are respectively shown in FIGS. 14 and 19, the chutes 75, 475 press on the filter section groups to form closed chambers and to thus prevent escape of granular filter material from such chambers as well as to prevent inward bending of the ends of the wrapper body.

Without further analysis, the foregoing will so fully reveal the gist of the present invention that others can, by applying current knowledge, readily adapted it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of producing composite mouthpieces for filter cigarettes and the like, comprising the steps of arranging a first rod-shaped member which constitutes a filter for tobacco smoke and is free of tobacco in axial alignment with but at a predetermined distance from a second rod-shaped member whereby said rod-shaped members are separated by a gap; applying around portions of said rod-shaped members an adhesive-coated wrapper to transform said gap into an open-sided pocket; introducing into said open-sided pocket a free-flowing stream of discrete particles of a flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said first rod-shaped member, constitutes a composite mouthpiece; and moving said rod-shaped members sideways, at the same speed, and in the same direction prior to and following the introduction of said flowable filter material.

2. A method of producing composite mouthpieces for filter cigarettes and the like, comprising the steps of arranging two rod-shaped members which constitute tobacco-free filters for tobacco smoke in axial alignment with but at a predetermined distance from each other whereby said rod-shaped members are separated by a gap; applying around portions of said rod-shaped members an adhesive-coated wrapper to transform said gap into an open-sided pocket; introducing into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said rod-shaped members, constitutes a composite mouthpiece; and moving said rod-shaped members sideways, at the same speed, and in the same direction prior to and following the introduction of said flowable filter material.

3. A method of producing composite mouthpieces for filter cigarettes and the like, comprising the steps of arranging two rod-shaped members which constitute tobacco-free filters for tobacco smoke and consist of identical materials in axial alignment with but at a predetermined distance from each other whereby said rod-shaped members are separated by a gap; applying around portions of said rod-shaped members an adhesive-coated wrapper to transform said gap into an open-sided pocket; introducing into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said rod-shaped members, constitutes a composite mouthpiece; and moving said rod-shaped members sideways, at the same speed and in the same direction prior to, during and following the introduction of said flowable filter material.

4. A method of producing composite mouthpieces for filter cigarettes and the like, comprising the steps of severing a tobacco-free filter rod of multiple unit length to form at least two rod-shaped members each of which constitutes a filter for tobacco smoke; shifting the rod-shaped members axially and away from each other to separate said members by a gap of predetermined length; applying around portions of said rod-shaped members an adhesive-coated wrapper to transform said gap into an open-sided pocket; introducing into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said rod-shaped members, constitutes a composite mouthpiece; and moving said rod-shaped members sideways, at the same speed, and in the same direction prior to and following the introduction of said flowable filter material.

5. A method of producing composite mouthpieces for filter cigarettes and the like, comprising the steps of severing a tobacco-free filter rod of multiple unit length to yield a plurality of rod-shaped members each of which constitutes a filter for tobacco smoke; shifting the rod-shaped members axially and away from each other to separate said members by gaps of predetermined length; applying around portions of said rod-shaped members an adhesive-coated wrapper to transform said gaps into open-sided pockets; introducing into each of said open-sided pockets a free-flowing stream of discrete particles of flowable filter material which is free of tobacco so that each pocket is at least partially filled with such flowable filter material; convoluting the wrapper around said rod-shaped members to seal said pockets whereby said flowable filter material is entrapped in the respective pockets to form additional filters for tobacco smoke which, together with said rod-shaped members, constitute a composite mouthpiece; and moving said rod-shaped members sideways, at the same speed, and in the same direction prior to and following the introduction of said flowable filter material.

6. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member of different material which also constitutes a tobacco-free filter for tobacco smoke whereby said rod-shaped members are separated by a gap; applying around portions of said rod-shaped members an adhesive-coated wrapper to transform said gap into an open-sided pocket; introducing into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said rod-shaped members, constitutes a composite mouthpiece; and moving said rod-shaped members sideways, at the same speed, and in the same direction prior to and following the introduction of said flowable filter material.

7. A method of producing composite mouthpieces for filter cigarettes and the like, comprising the steps of severing a first tobacco-free filter rod to form at least two rod-shaped members each of which constitutes a filter for tobacco smoke; shifting the rod-shaped members axially and away from each other to separate said members by a gap of predetermined length; shuffling said rod-shaped members with a third tobacco-free rod-shaped member whose length is less than the length of said gap so that the third rod-shaped member is located midway between said two members whereby the remainder of said gap forms two shorter gaps each adjacent to one end of said third rod-shaped member; applying around portions of said rod-shaped members an adhesive-coated wrapper to transform the shorter gaps into open-sided pockets; introducing into said open-sided pockets a free-flowing stream of discrete particles of flowable filter material which is free of tobacco so that each pocket is at least partially filled with such flowable filter material; convoluting the wrapper around said rod-shaped members to seal said pockets whereby said flowable filter material is entrapped in the respective pockets to form additional filters for tobacco smoke which, together with said rod-shaped members, constitute a composite mouthpiece and moving said rod-shaped members sideways, at the same speed, and in the same direction prior to and following the introduction of said flowable filter material.

8. A method of producing composite mouthpieces for filter cigarettes and the like, comprising the steps of severing each of two tobacco-free filter rods of multiple unit length which constitute filters for tobacco smoke and which consist of different materials into a group of coaxial rod-shaped members; shifting the rod-shaped members of each group axially and away from each other to provide between the members of each group gaps whose length exceeds the length of rod-shaped members in the other group; shuffling said groups so that each rod-shaped member of one group enters a gap between the rod-shaped members of the other group whereby said groups form an assembly of coaxial rod-shaped members at least some of which are separated from each other by gaps shorter than said first named gaps; applying around portions of said rod-shaped members an adhesive-coated wrapper to transform each shorter gap into an open-sided pocket; introducing into said pockets a free-flowing stream of discrete particles of flowable filter material which is free of tobacco so that each pocket is at least partially filled with such flowable filter material; convoluting the wrapper around said assembly to seal said pockets whereby said flowable filter material is entrapped in the respective pockets to form additional filters for tobacco smoke which, together with said rod-shaped members, constitute a composite mouthpiece and moving said rod-shaped members sideways, at the same speed, and in the same direction prior to and following the introduction of said flowable filter material.

9. A method of producing composite mouthpieces for filter cigarettes and the like, comprising the steps of severing each of two tobacco-free filter rods of multiple unit length which constitute filters for tobacco smoke and which consist of different materials into a group of coaxial rod-shaped members; shifting the rod-shaped members of each group axially and away from each other to provide between the members of each group gaps whose length exceeds the length of rod-shaped members in the other group; shuffling said groups so that each rod-shaped member of one group enters the median portion of a gap between the rod-shaped members of the other group whereby said groups form an assembly of coaxial rod-shaped members which are separated from each other by gaps of equal length each shorter than one of said first named gaps; applying around portions of said rod-shaped members an adhesive-coated wrapper to transform each shorter gap into an open-sided pocket; introducing into said pockets a free-flowing stream of discrete particles of flowable filter material which is free of tobacco so that each pocket is at least partially filled with such flowable filter material; convoluting the wrapper around said assembly to seal said pockets whereby the flowable filter material is entrapped in the respective pockets to form additional filters for tobacco smoke which, together with said rod-shaped members, constitute a composite mouthpiece and moving said rod-shaped members sideways, at the same speed, and in the same direction prior to and following the introduction of said flowable filter material.

10. A method of producing composite mouthpieces for filter cigarettes and the like, comprising the steps of severing a first tobacco-free filter rod of multiple unit length which constitutes a filter for tobacco smoke into at least one filter section of double unit length and two outer filters of unit length located at the opposite ends of said section; severing a second tobacco-free filter rod of multiple unit length which constitutes a different filter for tobacco smoke into at least two sections of double unit length; shifting the outer filters axially and away from each other to provide at each end of said first named section a gap exceeding by a predetermined distance the length of a section of said second filter rod; shifting the sections of said second filter rod axially and away from each other to provide between said last named sections a gap exceeding by said predetermined distance the length of the section of said first filter rod; shuffling said filters and said sections by moving the section of said first filter rod sideways into the central portion of the gap between the sections of said second filter rod and by moving the sections of said second filter rod sideways into the central portions of the gaps between said outer filters whereby said sections and said outer filters form an assembly of coaxial rod-shaped elements separated from each other by shorter gaps of equal length; applying around portions of said elements an adhesive-coated wrapper to transform each shorter gap into an open-sided pocket; introducing into said pockets a free-flowing stream of discrete particles of flowable filter material which is free of tobacco so that each pocket is at least partially filled with such flowable filter material; convoluting the wrapper around said assembly to seal said flowable pockets whereby said filter material is entrapped in the respective pockets to form additional filters for tobacco smoke which, together with said rod-shaped elements, constitute a composite mouthpiece; and moving said rod-shaped elements sideways, at the same speed and in the same direction immediately prior to and immediately following the introduction of said flowable filter material.

11. A method of producing composite mouthpieces for filter cigarettes and the like, comprising the steps of severing each of two tobacco-free filter rods of multiple unit length which constitute filters for tobacco smoke and which consist of different materials into a group of coaxial rod-shaped members; shifting the rod-shaped members of each group axially and away from each other to provide between the members of each group gaps of equal length exceeding by a predetermined distance the length of rod-shaped members in the other group; shuffling said groups so that each rod-shaped member of one group enters the median portion of a gap between the rod-shaped members of the other group whereby said groups form an assembly of coaxial rod-shaped members which are separated from each other by gaps of equal length each shorter than one of said first named gaps; applying around portions of said rod-shaped members an adhesive-coated wrapper to transform each shorter gap into an open-sided pocket; introducing into each of said pockets a predetermined quantity of discrete particles of flowable filter material which is free of tobacco and in free-flowing condition so that each pocket is substantially filled with such flowable filter material; convoluting the wrapper around said assembly to seal said pockets whereby the flowable filter material is entrapped in the respective pockets to form additional filters for tobacco smoke which, together with said rod-shaped members, constitute a composite mouthpiece, and moving said rod-shaped members sideways, at the same speed, and in the same direction prior to and following the introduction of said flowable filter material.

12. A method of producing tobacco smokers' articles with composite mouthpieces, comprising the steps of arranging a rod-shaped member which constitutes a tobacco-free filter for tobacco smoke in axial alignment with but at a predetermined distance from a tobacco rod whereby the adjacent ends of said rod-shaped member and said tobacco rod are separated by a gap; applying around portions of said rod-shaped member and said tobacco rod an adhesive-coated wrapper to transform said gap into an open-sided pocket; introducing into said open-sided pocket a free-flowing stream of discrete particles of flowable filter material which is free of tobacco so that the pocket is at least partially filled with such flowable filter material; convoluting the wrapper around said rod-shaped member and said tobacco rod to seal said pocket whereby said flowable filter material is entrapped in the pocket to form a filter for tobacco smoke, which, together with said rod-shaped member, constitutes a composite mouthpiece for the thus obtained smokers' article; and moving said tobacco rod and said rod-shaped member sideways, at the same speed, and in the same direction prior to and following the introduction of said flowable filter material.

13. A method of producing tobacco smokers' articles of multiple unit length with composite mouthpieces of double unit length, comprising the steps of arranging a pair of tobacco rods in axial alignment with but at a predetermined distance from each other whereby said tobacco rods are separated by a gap; introducing into the central portion of said gap a rod-shaped member which constitutes a tobacco-free filter for tobacco smoke and whose length is less than the length of said gap whereby the remainder of said gap forms two shorter gaps located at the ends of said rod-shaped member; applying around portions of said tobacco rods and said rod-shaped member an adhesive-coated wrapper to transform each of said shorter gaps into an open-sided pocket; introducing into each of said pockets a free-flowing stream of discrete particles of flowable filter material which is free of tobacco so that each pocket is at least partially filled with such flowable filter material; convoluting the wrapper around said tobacco rods and said rod-shaped member to seal said pockets whereby said flowable filter material is entrapped in the respective pockets to form additional filters for tobacco smoke which, together with said rod-shaped member, constitute a composite mouthpiece of double unit length for the thus obtained smokers' article; and moving said tobacco rods and said rod-shaped members sideways, in the same direction, and at the same speed prior to and following the introduction of said flowable filter material.

14. A method of producing tobacco smokers' articles of multiple unit length with composite mouthpieces of double unit length, comprising the steps of arranging a pair of tobacco rods in axial alignment with but at a predetermined distance from each other whereby said tobacco rods are separated by a gap; introducing into said gap a rod-shaped member which constitutes a tobacco-free filter for tobacco smoke and whose length is less than the length of said gap whereby the remainder of said gap forms at least one shorter gap; applying around portions of said tobacco rods and said rod-shaped member an adhesive-coated wrapper to transform said shorter gap into an open-sided pocket; introducing into said pocket a free-flowing stream of discrete particles of flowable filter material which is free of tobacco so that the pocket is at least partially filled with such flowable filter material; convoluting the wrapper around said tobacco rods and said rod-shaped member to seal said pocket whereby said flowable filter material is entrapped in said pocket to form a filter for tobacco smoke which, together with said rod-shaped member, constitutes a composite mouthpiece for the thus obtained smokers' article; and moving said tobacco rods and said rod-shaped member sideways, in the same direction, and at the same speed prior to, during the following the introduction of said flowable filter material.

15. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; forming a mixture of two flowable filter materials each of which consists of discrete tobacco-free particles and introducing such mixture in free-flowing condition into said pocket so that the pocket is at least partially filled; convoluting the wrapper around said rod-shaped members to seal said pocket whereby said mixture is entrapped in the pocket to form a filter for tobacco smoke which, together with said first rod-shaped member, constitutes a composite mounthpiece; and moving said rod-shaped members sideways, in the same direction, and at the same speed prior to and following the introduction of said mixture.

16. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket whose open side faces upwardly; introducing, by gravity feed, into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said first rod-shaped member, constitutes a composite mouthpiece; and moving said rod-shaped members sideways and in axial alignment with each other prior to, during and following the introduction of said flowable filter material.

17. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; introducing by centrifugal force into said open-sided pocket a free-flowing stream of discrete particles of flowable filter material which is free of tobacco so that the pocket is at least partially filled with such flowable filter material; convoluting the wrapper around said rod-shaped members to seal said pocket whereby said flowable filter material is entrapped in the pocket to form a filter for tobacco smoke which, together with said first rod-shaped member, constitutes a composite mouthpiece; and moving said rod-shaped members sideways, at the same speed, and in the same direction prior to and following the introduction of said flowable filter material.

18. A method of producing composite mouthpieces for filter cigarettes and the like, comprising the steps of arranging a first rod-shaped member which constitutes a filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; introducing into said open-sided pocket a granular filter material in admixture with compressed gas so that the pocket is at least partially filled with such material; and convoluting the wrapper around said rod-shaped members to seal said pocket whereby said filter material is entrapped in the pocket to form a filter for tobacco smoke which, together with said first rod-shaped member, constitutes a composite mouthpiece.

19. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; advancing the rod-shaped members and the wrapper sideways along a predetermined path; introducing into said open-sided pocket a free-flowing stream of discrete particles of flowable filter material which is free of tobacco so that the pocket is at least partially filled with such flowable filter material while said wrapper and said rod-shaped members continue to advance sideways along said predetermined path; and convoluting the wrapper around said rod-shaped members to seal said pocket whereby said flowable filter material is entrapped in the pocket to form a filter for tobacco smoke which, together with said first rod-shaped member, constitutes a composite mouthpiece.

20. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; introducing into said open-sided pocket a measured quantity of discrete particles of flowable filter material which is free of tobacco in free-flowing condition so that the pocket is at least partially filled with such flowable filter material; convoluting the wrapper around said rod-shaped members to seal said pocket whereby said filter material is entrapped in the pocket to form a filter for tobacco smoke which, together with said first rod-shaped member, constitutes a composite mouthpiece; and moving said rod-shaped members sideways, at the same speed, and in the same direction prior to and following the introduction of said flowable filter material.

21. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; agitating a supply of discrete particles of flowable tobacco-free granular filter material and separating from the thus agitated supply a measured quantity of such flowable granular filter material; introducing said measured quantity of flowable granular filter material in free-flowing condition into said pocket so that the pocket is at least partially filled; convoluting the wrapper around said rod-shaped members to said said pocket whereby said measured quantity of flowable granular filter material is entrapped in the pocket to form a filter for tobacco smoke which, together with said first rod-shaped member, constitutes a composite mouthpiece; and moving said rod-shaped members sideways, at the same speed, and in the direction prior to and following the introduction of said flowable filter material.

22. A method of producing composite mouthpieces for filter cigarettes and the like, comprising the steps of arranging consecutive first rod-shaped members which constitute tobacco-free filters for tobacco smoke in axial alignment with but at a predetermined distance from consecutive second rod-shaped members whereby said first rod-shaped members and the aligned second rod-shaped members are separated by gaps of predetermined length; applying around portions of each of consecutively aligned pairs of first and second rod-shaped members an adhesive-coated wrapper to transform the respective gaps into open-sided pockets and to form consecutive assemblies of aligned rod-shaped members joined by said wrappers; introducing into each consecutive open-sided pocket a free-flowing stream of discrete particles of flowable filter material which is free of tobacco so that the respective pockets are at least partially filled with such flowable filter material; convoluting the consecutively applied wrappers around the respective pairs of first and second rod-shaped members to seal the corresponding pockets whereby said flowable filter material is entrapped in the pockets to form filters each of which, together with the corresponding first rod-shaped member, constitutes a composite mouthpiece; and moving said pairs of first and second rod-shaped members sideways, at the same speed, and in the same direction prior to and following the introduction of said flowable filter material.

23. A method of producing composite mouthpieces for filter cigarettes and the like, comprising the steps of arranging consecutive first rod-shaped members which constitute tobacco-free filters for tobacco smoke in axial alignment with but at a predetermined distance from consecutive second rod-shaped members whereby said first rod-shaped members and the aligned second rod-shaped members are separated by gaps of predetermined length; applying around portions of each of consecutively aligned pairs of first and second rod-shaped members an adhesive-coated wrapper to transform the respective gaps into open-sided pockets and to form consecutive assemblies of aligned rod-shaped members joined by said wrappers; introducing into each consecutive open-sided pocket a free-flowing stream of discrete particles of flowable filter material which is free of tobacco so that the respective pockets are at least partially filled with such flowable filter material; convoluting the consecutively applied wrappers around the respective pairs of first and second rod-shaped members to seal the corresponding pockets whereby said flowable filter material is entrapped in the pockets to form filters each of which, together with the corresponding first rod-shaped member, constitutes a composite mouthpiece; moving said pairs of rod-shaped members sideways, at the same speed, and in the same direction prior to, during and following the introduction of said flowable filter material; testing each of said assemblies for completeness; and interrupting the admission of said filter material in response to detection of incomplete assemblies.

24. A method of producing composite mouthpieces for filter cigarettes and the like, comprising the steps of arranging consecutive first rod-shaped members which constitute tobacco-free filters for tobacco smoke in axial alignment with but at a predetermined distance from consecutive second rod-shaped members whereby said first rod-shaped members and the aligned second rod-shaped members are separated by gaps of predetermined length; applying around portions of each of consecutively aligned pairs of first and second rod-shaped members an adhesive-coated wrapper to transform the respective gaps into open-sided pockets and to form consecutive assemblies of aligned rod-shaped members joined by said wrappers; automatically feeding into each consecutive open-sided pocket a free-flowing stream of discrete particles or flowable filter material which is free of tobacco so that the respective pockets are at least partially filled with such flowable filter material; convoluting the consecutively applied wrappers around the respective pairs of first and second rod-shaped members to seal the corresponding pockets whereby said flowable filter material is entrapped in the pockets to form filters each of which, together with the corresponding first rod-shaped member, constitutes a composite mouthpiece; moving said pairs of rod-shaped members sideways, at the same speed, and in the same direction prior to and subsequent to introduction of said flowable filter material and, whenever necessary, interrupting the feed of filter material independently of the remaining steps.

25. A method of producing composite mouthpieces for filter cigarettes and the like, comprising the steps of arranging a first rod-shaped member which constitutes a tobacco-free filter for tobacco smoke in axial alignment with but at a predetermined distance from a second rod-shaped member whereby said rod-shaped members are separated by a gap; applying around portions of said rod-shaped members an adhesive-coated wrapper to transform said gap into an open-sided pocket; introducing into said open-sided pocket a free-flowing stream of discrete particles of tobacco-free flowable granular filter material so that the pocket is at least partially filled with such flowable granular filter material; convoluting the wrapper around said rod-shaped members to seal said pocket whereby said flowable granular filter material is entrapped in the pocket to form a filter for tobacco smoke which, together with said first rod-shaped member, constitutes a composite mouthpiece; and moving said rod-shaped members sideways, at the same speed, and in the same direction prior to, during and following the introduction of said flowable granular filter material.

26. A method of producing smokers' articles of multiple unit length with composite mouthpieces of double unit length, comprising the steps of arranging a pair of outer rod-shaped members which constitute tobacco-free filters for tobacco smoke in axial alignment with but at a predetermined distance from each other; introducing midway between said outer rod-shaped members an inner rod-shaped member which also constitutes a tobacco-free filter for tobacco smoke and whose length is less than the distance between said outer rod-shaped members whereby said rod-shaped members define a pair of gaps which are located at the ends of said inner rod-shaped member; shuffling the thus obtained group of coaxial rod-shaped members with a pair of axially spaced tobacco rods so that the rod-shaped members are located intermediate said tobacco rods; applying an adhesive-coated wrapper around portions of said tobacco rods and said rod-shaped members to transform said gaps into open-sided pockets; introducing into each of said pockets a free-flowing stream of discrete particles of flowable filter material which is free of tobacco so that each pocket is at least partially filled with such flowable filter material; convoluting the wrapper around said tobacco rods and said rod-shaped members to seal said pockets whereby said flowable filter material is entrapped in the respective pockets to form additional filters which, together with said rod-shaped members, constitute between said tobacco rods a mouthpiece of double unit length; and moving said tobacco rods and said rod-shaped members in axial alignment with each other and sideways prior to, during and following the introduction of said flowable filter material.

27. A method of producing smokers' articles of multiple unit length with composite mouthpieces of double unit length, comprising the steps of severing a tobacco-free filter section of double unit length to yield a pair of rod-shaped members of unit length; shifting said rod-shaped members axially and away from each other through a predetermined distance; inserting midway between said rod-shaped members a third rod-shaped member whose length is less than the distance between said pair of rod-shaped members whereby said rod-shaped members define between themselves two gaps of equal length and said rod-shaped members together form a group of coaxial elements; inserting said group midway between a pair of coaxial but spaced tobacco rods; applying around portions of said rod-shaped members and said tobacco rods an adhesive-coated wraper to transform said gaps into open-sided pockets; introducing into said pockets a free-flowing stream of discrete particles of flowable filter material which is free of tobacco so that each pocket is at least partially filled with such flowable filter material; convoluting the wrapper around said rod-shaped members and said tobacco rods to seal said pockets whereby said flowable filter material is entrapped in the respective pockets to form with said rod-shaped members a mouthpiece of double unit length; and moving said tobacco rods and said rod-shaped members in axial alignment with each other and sideways prior to, during and following the introduction of said flowable filter material.

28. A method as set forth in claim 27 wherein the distance between said tobacco rods equals the length of said group so that each tobacco rods abuts against one of said rod-shaped members of unit length.

29. A method as set forth in claim 27, wherein the distance between said tobacco rods exceeds the length of said group so that two additional gaps develop adjacent to said tobacco rods when said group is placed between the tobacco rods, and further comprising introducing discrete particles of flowable filter material which is free of tobacco in free-flowing condition into the pockets formed from said additional gaps so that, when said wrapper is convoluted, the material entrapped in the pockets formed from said additional gaps constitutes two additional filters.

30. A method as set forth in claim 27, wherein said third rod-shaped member is a prefabricated mouthpiece of double unit length.

31. A method as set forth in claim 27, wherein said tobacco rods are cigarette rods of unit length.

32. A method of producing smokers' articles of multiple unit length with composite mouthpieces of double unit length, comprising the steps of severing a tobacco-free filter section of double unit length to yield a pair of rod-shaped members of unit length; shifting said rod-shaped members axially and away from each other through a predetermined distance; inserting midway between said rod-shaped members a third rod-shaped member whose length is less than the distance between said pair of rod-shaped members whereby said rod-shaped members define between themselves two gaps of equal length and said rod-shaped members together form a group of coaxial elements; inserting said group midway between a pair of coaxial but spaced tobacco rods; shifting said tobacco rods axially into abutment with the respective rod-shaped members of unit length; applying around portions of said rod-shaped members and tobacco rods an adhesive-coated wrapper to transform said gaps into open-sided pockets; introducing into said pockets a free-flowing stream of discrete particles of flowable filter material which is free of tobacco so that each pocket is at least partially filled with such flowable filter material; convoluting the wrapper around said rod-shaped members and said tobacco rods to seal said pockets whereby said flowable filter material is entrapped in the respective pockets to form with said rod-shaped members a mouthpiece of double unit length; and moving said tobacco rods and said rod-shaped members in axial alignment with each other and sideways prior to, during and following the introduction of said flowable filter material.

References Cited by the Examiner

UNITED STATES PATENTS

| | | | |
|---|---|---|---|
| 2,093,051 | 9/1937 | May | 131—61 |
| 2,156,600 | 5/1939 | Molins | 131—94 |
| 2,423,554 | 7/1947 | Davidson | 131—61 |
| 2,740,409 | 4/1956 | Korber | 131—94 |
| 2,802,470 | 8/1957 | Treble | 131—94 |
| 2,821,199 | 1/1958 | Korber | 131—94 |
| 2,923,034 | 2/1960 | Dickie et al. | 131—208 X |
| 3,039,367 | 6/1962 | Stelzer | 131—94 X |
| 3,052,164 | 9/1962 | Rowlands | 93—1 |
| 3,064,541 | 11/1962 | Mantchev | 93—1 |
| 3,259,029 | 7/1966 | Hall et al. | 131—94 X |

SAMUEL KOREN, *Primary Examiner.*

ALDRICH F. MEDBERY, *Examiner.*

H. P. DEELEY, JR., *Assistant Examiner.*